(12) United States Patent
Xu et al.

(10) Patent No.: US 12,167,423 B2
(45) Date of Patent: Dec. 10, 2024

(54) MULTIMEDIA BROADCAST AND MULTICAST SERVICE (MBMS) TRANSMISSION AND RECEPTION IN CONNECTED STATE DURING WIRELESS COMMUNICATIONS

(71) Applicant: Apple Inc., Cupertino, CA (US)

(72) Inventors: Fangli Xu, Beijing (CN); Haijing Hu, Beijing (CN); Dawei Zhang, Saratoga, CA (US); Yuqin Chen, Shenzhen (CN); Chunhai Yao, Beijing (CN); Yushu Zhang, Beijing (CN); Wei Zeng, San Diego, CA (US)

(73) Assignee: Apple Inc., Cupertino, CA (US)

( * ) Notice: Subject to any disclaimer, the term of this patent is extended or adjusted under 35 U.S.C. 154(b) by 239 days.

(21) Appl. No.: 17/438,250

(22) PCT Filed: Oct. 22, 2020

(86) PCT No.: PCT/CN2020/122777
§ 371 (c)(1),
(2) Date: Sep. 10, 2021

(87) PCT Pub. No.: WO2022/082589
PCT Pub. Date: Apr. 28, 2022

(65) Prior Publication Data
US 2022/0322288 A1 Oct. 6, 2022

(51) Int. Cl.
*H04W 72/30* (2023.01)
(52) U.S. Cl.
CPC .................. *H04W 72/30* (2023.01)
(58) Field of Classification Search
CPC .................................................. H04W 72/30
(Continued)

(56) References Cited

U.S. PATENT DOCUMENTS

2010/0061285 A1* 3/2010 Maeda ................. H04W 76/28
370/312
2018/0192255 A1* 7/2018 Guo ...................... H04W 72/30
(Continued)

FOREIGN PATENT DOCUMENTS

CN 101076176 A 11/2007
CN 110089155 8/2019
(Continued)

OTHER PUBLICATIONS

International Search Report for PCT Patent Application No. PCT/CN2020/122777; mailed Oct. 22, 2020.
(Continued)

*Primary Examiner* — Mark G. Pannell
(74) *Attorney, Agent, or Firm* — Kowert, Hood, Munyon, Rankin & Goetzel, P.C.

(57) ABSTRACT

User equipment devices (UEs) may receive multimedia broadcast and multicast service (MBMS) transmissions over a bandwidth part (BWP) specifically allocated for MBMS point-to-multipoint (PTM) transmissions, or over MBMS-specific resources configured for PTM transmissions within a UE-dedicated BWP. The network (e.g. base station) may configure the MBMS-specific BWP for the UE for the PTM transmissions per serving cell. The MBMS-specific BWP may be used for downlink transmissions, and may be cell specific or UE specific per serving cell. The base station may provide MBMS PTM scheduling information per BWP to the UE, may indicate whether a UE-dedicated BWP may be used for PTM scheduling and transmission, and may provide the corresponding scheduling configuration when applicable. The UE may communicate its various capabilities related to MBMS reception and simultaneous reception of PTM and point-to-point (PTP) transmissions to the base
(Continued)

station to aid the base station in scheduling communications of the UE.

20 Claims, 14 Drawing Sheets

(58) Field of Classification Search
USPC .......................................................... 370/312
See application file for complete search history.

(56) References Cited

U.S. PATENT DOCUMENTS

| | | | |
|---|---|---|---|
| 2020/0267511 A1* | 8/2020 | Abdoli | H04W 76/11 |
| 2020/0351818 A1* | 11/2020 | Park | H04W 4/90 |
| 2021/0029513 A1* | 1/2021 | Rico Alvarino | H04W 72/121 |
| 2021/0044384 A1* | 2/2021 | Sengupta | H04L 1/0045 |
| 2021/0045017 A1* | 2/2021 | Takeda | H04L 12/189 |
| 2021/0250958 A1* | 8/2021 | Liu | H04L 5/0053 |
| 2022/0046689 A1* | 2/2022 | Lee | H04L 5/0053 |
| 2022/0109963 A1* | 4/2022 | Li | H04W 72/30 |
| 2022/0132467 A1* | 4/2022 | Shrivastava | H04W 4/06 |
| 2022/0338070 A1* | 10/2022 | Wang | H04W 48/16 |
| 2022/0345853 A1* | 10/2022 | Chen | H04W 48/10 |
| 2022/0361154 A1* | 11/2022 | Yoshioka | H04L 1/1671 |
| 2023/0027089 A1* | 1/2023 | Pelletier | H04L 1/1812 |
| 2023/0027505 A1* | 1/2023 | Wu | H04W 4/06 |
| 2023/0029998 A1* | 2/2023 | Narayanan Thangaraj | H04W 72/30 |
| 2023/0040690 A1* | 2/2023 | Chen | H04W 4/06 |
| 2023/0044962 A1* | 2/2023 | Kim | H04W 76/40 |
| 2023/0050170 A1* | 2/2023 | Wang | H04L 1/1854 |
| 2023/0090851 A1* | 3/2023 | Xin | H04W 72/0453 370/312 |
| 2023/0093727 A1* | 3/2023 | Lin | H04L 1/0061 370/312 |
| 2023/0110505 A1* | 4/2023 | Wang | H04L 1/08 370/331 |
| 2023/0155741 A1* | 5/2023 | Jang | H04L 1/1864 370/312 |
| 2023/0171791 A1* | 6/2023 | Fujishiro | H04W 4/06 370/312 |
| 2023/0180269 A1* | 6/2023 | Li | H04W 72/30 370/312 |
| 2023/0188271 A1* | 6/2023 | Lipka | H04L 1/1893 370/312 |
| 2023/0262422 A1* | 8/2023 | Wang | H04W 76/40 370/312 |
| 2023/0262735 A1* | 8/2023 | Wu | H04L 1/1864 370/312 |
| 2023/0276468 A1* | 8/2023 | Wu | H04W 36/00692 370/312 |
| 2023/0276470 A1* | 8/2023 | Di Girolamo | H04W 4/06 370/312 |
| 2024/0032070 A1* | 1/2024 | Zhou | H04W 72/232 |

FOREIGN PATENT DOCUMENTS

| | | |
|---|---|---|
| CN | 110115013 | 8/2019 |
| CN | 111385832 | 7/2020 |
| CN | 111386731 | 7/2020 |
| CN | 112218310 | 1/2021 |
| WO | 2020198415 A1 | 10/2020 |

OTHER PUBLICATIONS

Moderator (CMCC) "Summary#1 on NR Multicast and Broadcast Services"; 3GPP TSG RAN WG1 #102-e R1-2007089; Aug. 28, 2020.
Moderator (CMCC) "FL summary on NR Multicast and Broadcast Services" 3GPP TSG RAN WG1 #102-e R1-2007001; Aug. 28, 2020.
LG Electronics Inc. "Basic function for broadcast/multicast" 3GPP TSG RAN WG1 Meeting #102-e R1-2006322; Aug. 28, 2020.
Extended European Search Report for EP 20958172.7; Jun. 11, 2024.
OPPO "General considerations for MBS in RRC_CONNECTED", 3GPP TSG-RAN WG2 Meeting #111 R2-2006804; Aug. 17, 2020.
LG Electronics Inc "Supporting of group scheduling for RRC_CONNECTED UEs", 3GPP RSG RAN WG1 Meeting #102e R1-2006320; Aug. 17, 2020.

* cited by examiner

MULTIMEDIA BROADCAST AND MULTICAST SERVICE (MBMS) TRANSMISSION AND RECEPTION IN CONNECTED STATE DURING WIRELESS COMMUNICATIONS

PRIORITY CLAIM INFORMATION

This application is a national stage application of International Application No. PCT/CN2020/122777, filed on Oct. 22, 2020, titled "Multimedia Broadcast and Multicast Service (MBMS) Transmission and Reception in Connected State during Wireless Communications", which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, including technologies for Multimedia Broadcast and Multicast Service (MBMS) transmission and reception in connected state during wireless communications, e.g. during 3GPP NR communications.

BACKGROUND

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc. A proposed telecommunications standard moving beyond the International Mobile Telecommunications-Advanced (IMT-Advanced) Standards is 5th generation mobile networks or 5th generation wireless systems, referred to as 3GPP NR (otherwise known as 5G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than LTE standards.

One aspect of cellular communication systems involves multimedia broadcast and multicast services and associated transmissions. Improvements in the field are desired.

Aspects are presented herein of, inter alia, of technologies for implementing a group scheduling mechanism that allows user equipment devices (UEs) to receive broadcast and multicast service transmissions, and further for implementing simultaneous operation with unicast transmission/reception, during wireless communications, for example during 3GPP New Radio (NR) communications. Aspects are further presented herein for wireless communication systems containing user equipment (UE) devices and/or base stations communicating with each other within the wireless communication systems as proposed herein to implement reception of broadcast and multicast service transmissions and simultaneous provisioning of broadcast/multicast services with unicast services.

Pursuant to the above, a device, e.g. a UE, may wirelessly communicate within a wireless network, and may receive, in connected state as part of wirelessly communicating within the wireless network, a multimedia broadcast and multicast service (MBMS) transmission over a first bandwidth part (BWP) specifically allocated for MBMS transmissions, or over a second BWP using first resources specifically allocated for MBMS transmissions within the second BWP. In addition, the UE may receive a unicast transmission over a third BWP different from the first BWP, and may receive the unicast transmission and the MBMS transmission simultaneously. The MBMS transmission may be a point-to-multipoint (PTM) transmission. The UE may receive a second MBMS transmission as a point-to-point (PTP) transmission when the device cannot support simultaneous reception of MBMS and unicast transmissions. The MBMS transmission may include MBMS scheduling information and/or MBMS data.

In some aspects, the UE may transmit capability information to a base station to indicate to the base station whether the UE supports simultaneous reception of MBMS and unicast transmissions. The capability may be defined per band combination, per band, or per UE. In some cases, first BWP may completely overlap with a third BWP used by the UE for receiving a unicast transmission, whereas in some cases the first BWP may correspond to a portion of a wider second BWP used by the UE for receiving a unicast transmission. The first BWP may correspond to a serving cell of the UE. In some aspects, the UE may receive, in a connected state as part of wirelessly communicating within the wireless network, multiple MBMS transmissions over respective corresponding BWPs specifically allocated for MBMS transmissions, with each BWP of the respective corresponding BWPs associated with a different respective serving cell of the UE.

The first BWP may be cell-specific per serving cell of the UE or it may be UE-specific per serving cell of the UE. In some cases, the UE may start and stop reception of the MBMS transmission based on or more of the following
- an explicit indication received in a common command for starting the reception, and an explicit indication received in a subsequent common command for stopping the reception;
- an explicit indication received in a UE-specific command for starting the reception, and an explicit indication received in a subsequent UE-specific command for stopping the reception; or
- an autonomous determination by the UE whether to receive the MBMS data transmission.

In some cases the UE may receive a unicast transmission over a third BWP in a time division multiplexed manner with respect to the MBMS transmission over the first BWP. The UE may further receive the unicast transmission over the third BWP and not receive any MBMS transmissions over the first BWP during a time period when the unicast transmission and MBMS transmissions take place simultaneously. In addition, the UE may receive the MBMS transmission over the first BWP only when no unicast transmission takes place over the third BWP. The UE may also cease receiving MBMS transmissions over the first BWP and receive MBMS transmissions scheduled via a PTP transmission. The UE may receive the MBMS transmission over the second BWP when the second BWP is active for the UE, and may receive a unicast transmission over the third BWP when the third BWP is active for the UE. The MBMS transmission may be received by the UE over the second BWP when the second BWP is active, according to scheduling configuration and resource information previously transmitted by the base station to the UE and received by the UE.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
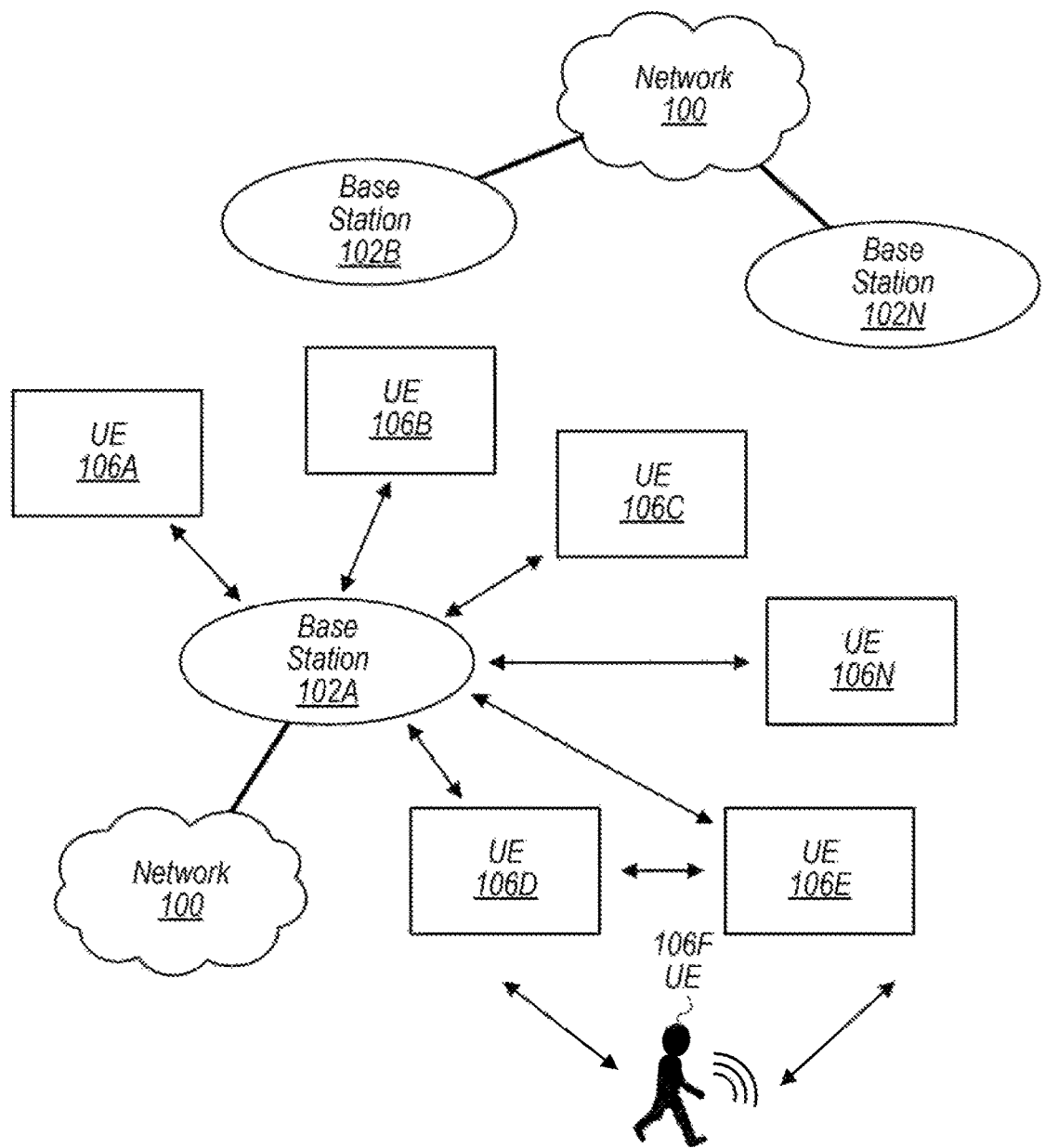
FIG. 1 illustrates an exemplary (and simplified) wireless communication system, according to some aspects.

While features described herein are susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

ACK: Acknowledge
AMF: Access Mobility and Management Function
APR: Applications Processor
AUL: Autonomous Uplink Transmission
BLER: Block Error Rate
BS: Base Station
BSR: Buffer Status Report
BWP: Bandwidth Part
CAPC: Channel Access Priority Class
CG: Configured Grant
CMR: Change Mode Request
CORESET: Control Channel Resource Set
COT: Channel Occupancy Time
CRC: Cyclic Redundancy Check
CS-RNTI: Configured Scheduling Radio Network Temporary Identifier
CSI: Channel State Information
DCI: Downlink Control Information
DG: Dynamic Grant
DL: Downlink (from BS to UE)
DMRS: Demodulation Reference Signal
DRB: (user) Data Radio Bearer
DYN: Dynamic
ED: Energy Detection
FDM: Frequency Division Multiplexing
FT: Frame Type
GC-PDCCH: Group Common Physical Downlink Control Channel
GPRS: General Packet Radio Service
GSM: Global System for Mobile Communication
GTP: GPRS Tunneling Protocol
HARQ: Hybrid Automatic Repeat Request
IR: Initialization and Refresh state
LAN: Local Area Network
LMF: Location Management Function
LPP: LTE Positioning Protocol LTE: Long Term Evolution
MAC: Media Access Control
MAC-CE: MAC Control Element
MBMS: Multimedia Broadcast & Multicast Service
MCS: Modulation and Coding Scheme
MIB: Master Information Block
MIMO: Multiple-In Multiple-Out
MRB: MBMS PTM Radio Bearer
NDI: New Data Indication
OFDM: Orthogonal Frequency Division Multiplexing
OSI: Open System Interconnection
PBCH: Physical Broadcast Channel
PDCCH: Physical Downlink Control Channel
PDCP: Packet Data Convergence Protocol
PDN: Packet Data Network
PDSCH: Physical Downlink Shared Channel
PDU: Protocol Data Unit
PRB: Physical Resource Block
PTM: Point-to-Multipoint
PTP: Point-to-Point
PUCCH: Physical Uplink Control Channel
PUSCH: Physical Uplink Shared (data) Channel
QCL: Quasi Co-Location
RACH: Random Access Procedure
RAT: Radio Access Technology
RB: Resource Block
RE: Resource Element
RF: Radio Frequency
RLC: Radio Link Control
RMSI: Remaining Minimum System Information
RNTI: Radio Network Temporary Identifier
ROHC: Robust Header Compression
RRC: Radio Resource Control
RS: Reference Signal (Symbol)
RSI: Root Sequence indicator
RTP: Real-time Transport Protocol
RV: Redundancy Version
RX: Reception/Receive
SDAP: Service Data Adaptation Protocol
SDM: Spatial Division Multiplexing
SID: System Identification Number
SGW: Serving Gateway
SR: Scheduling Request
SRS: Sounding Reference Signal
SS: Search Space
SSB: Synchronization Signal Block
TBS: Transport Block Size
TCI: Transmission Configuration Indication
TDM: Time Division Multiplexing
TRS: Tracking Reference Signal
TX: Transmission/Transmit
UCI: Uplink Control Information
UE: User Equipment
UL: Uplink (from UE to BS)
UMTS: Universal Mobile Telecommunication System
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage: registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, unmanned aerial vehicles (e.g., drones) and unmanned aerial controllers, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band (or Frequency Band)—The term "band" has the full breadth of its ordinary meaning, and at least includes a section of spectrum (e.g., radio frequency spectrum) in which channels are used or set aside for the same purpose. Furthermore, "frequency band" is used to denote any interval in the frequency domain, delimited by a lower frequency and an upper frequency. The term may refer to a radio band or an interval of some other spectrum. A radio communications signal may occupy a range of frequencies over which (or where) the signal is carried. Such a frequency range is also referred to as the bandwidth of the signal. Thus, bandwidth refers to the difference between the upper frequency and lower frequency in a continuous band of frequencies. A frequency band may represent one communication channel or it may be subdivided into multiple communication channels. Allocation of radio frequency ranges to different uses is a major function of radio spectrum allocation.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 80211 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Transmission Scheduling—Refers to the scheduling of transmissions, such as wireless transmissions. In some implementations of cellular radio communications, signal and data transmissions may be organized according to designated time units of specific duration during which transmissions take place. As used herein, the term "slot" has the full extent of its ordinary meaning, and at least refers to a smallest (or minimum) scheduling time unit in wireless communications. For example, in 3GPP LTE, transmissions are divided into radio frames, each radio frame being of equal (time) duration (e.g. 10 ms). A radio frame in 3GPP LTE may be further divided into a specified number of (e.g. ten) subframes, each subframe being of equal time duration, with the subframes designated as the smallest (minimum) scheduling unit, or the designated time unit for a transmission. Thus, in a 3GPP LTE example, a "subframe" may be considered an example of a "slot" as defined above. Similarly, a smallest (or minimum) scheduling time unit for 5G NR (or NR, for short) transmissions is referred to as a "slot". In different communication protocols the smallest (or minimum) scheduling time unit may also be named differently.

Resources—The term "resource" has the full extent of its ordinary meaning and may refer to frequency resources and time resources used during wireless communications. As used herein, a resource element (RE) refers to a specific amount or quantity of a resource. For example, in the context of a time resource, a resource element may be a time period of specific length. In the context of a frequency resource, a resource element may be a specific frequency bandwidth, or a specific amount of frequency bandwidth, which may be centered on a specific frequency. As one specific example, a resource element may refer to a resource unit of 1 symbol (in reference to a time resource, e.g. a time period of specific length) per 1 subcarrier (in reference to a frequency resource, e.g. a specific frequency bandwidth, which may be centered on a specific frequency). A resource element group (REG) has the full extent of its ordinary meaning and at least refers to a specified number of consecutive resource elements. In some implementations, a resource element group may not include resource elements reserved for reference signals. A control channel element (CCE) refers to a group of a specified number of consecutive REGs. A resource block (RB) refers to a specified number of resource elements made up of a specified number of subcarriers per specified number of symbols. Each RB may include a specified number of subcarriers. A resource block group (RBG) refers to a unit including multiple RBs. The number of RBs within one RBG may differ depending on the system bandwidth.

Bandwidth Part (BWP)—A carrier bandwidth part (BWP) is a contiguous set of physical resource blocks selected from a contiguous subset of the common resource blocks for a given numerology on a given carrier. For downlink, a UE may be configured with up to a specified number of carrier BWPs (e.g. four BWPs, per some specifications), with one BWP per carrier active at a given time (per some specifications). For uplink, the UE may similarly be configured with up to several (e.g. four) carrier BWPs, with one BWP per carrier active at a given time (per some specifications). If a UE is configured with a supplementary uplink, then the UE may be additionally configured with up to the specified number (e.g. four) carrier BWPs in the supplementary uplink, with one carrier BWP active at a given time (per some specifications).

Multi-cell Arrangements—A Master node is defined as a node (radio access node) that provides control plane connection to the core network in case of multi radio dual connectivity (MR-DC). A master node may be a master eNB (3GPP LTE) or a master gNB (3GPP NR), for example. A secondary node is defined as a radio access node with no control plane connection to the core network, providing additional resources to the UE in case of MR-DC. A Master Cell group (MCG) is defined as a group of serving cells associated with the Master Node, including the primary cell (PCell) and optionally one or more secondary cells (SCell). A Secondary Cell group (SCG) is defined as a group of serving cells associated with the Secondary Node, including a special cell, namely a primary cell of the SCG (PSCell), and optionally including one or more SCells. A UE may typically apply radio link monitoring to the PCell. If the UE is configured with an SCG then the UE may also apply radio link monitoring to the PSCell. Radio link monitoring is generally applied to the active BWPs and the UE is not required to monitor inactive BWPs. The PCell is used to initiate initial access, and the UE may communicate with the PCell and the SCell via Carrier Aggregation (CA). Currently Amended capability means a UE may receive and/or transmit to and/or from multiple cells. The UE initially connects to the PCell, and one or more SCells may be configured for the UE once the UE is in a connected state.

Core Network (CN)—Core network is defined as a part of a 3GPP system which is independent of the connection technology (e.g. the Radio Access Technology, RAT) of the UEs. The UEs may connect to the core network via a radio access network, RAN, which may be RAT-specific.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
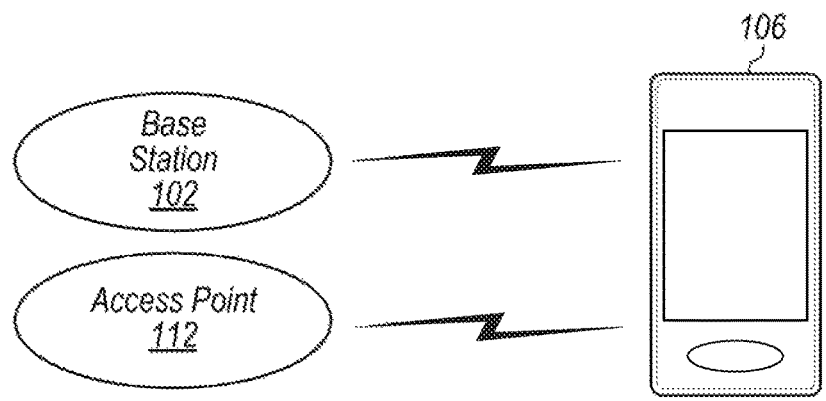
FIG. 2 illustrates an exemplary base station in communication with an exemplary wireless user equipment (UE) device, according to some aspects.

FIGS. 1 and 2—Exemplary Communication Systems

3GPP LTE/NR defines a number of downlink (DL) physical channels, categorized as transport or control channels, to carry information blocks received from the MAC and higher layers. 3GPP LTE/NR also defines physical layer channels for the uplink (UL). The Physical Downlink Shared Channel (PDSCH) is a DL transport channel, and is the main data-bearing channel allocated to users on a dynamic and opportunistic basis. The PDSCH carries data in Transport Blocks (TB) corresponding to a media access control protocol data unit (MAC PDU), passed from the MAC layer to the physical (PHY) layer once per Transmission Time Interval (TTI). The PDSCH is also used to transmit broadcast information such as System Information Blocks (SIB) and paging messages.

The Physical Downlink Control Channel (PDCCH) is a DL control channel that carries the resource assignment for UEs that are contained n a Downlink Control Information (DCI) message. For example, the DCI may include a transmission configuration indication (TCI) relating to beamforming, with the TCI including configurations such as quasi-co-located (QCL) relationships between the downlink reference signals (DL-RSs) in one Channel State Information RS (CSI-RS) set and the PDSCH Demodulation Reference Signal (DMRS) ports. Each TCI state can contain parameters for configuring a QCL relationship between one or two downlink reference signals and the DMRS ports of the PDSCH, the DMRS port of PDCCH or the CSI-RS port(s) of a CSI-RS resource. Multiple PDCCHs can be transmitted in the same subframe using Control Channel Elements (CCE), each of which is a set of resource elements known as Resource Element Groups (REG). The PDCCH can employ quadrature phase-shift keying (QPSK) modulation, with a specified number (e.g. four) of QPSK symbols mapped to each REG. Furthermore, a specified number (e.g. 1, 2, 4, or 8) of CCEs can be used for a UE, depending on channel conditions, to ensure sufficient robustness.

The Physical Uplink Shared Channel (PUSCH) is a UL channel shared by all devices (user equipment, UE) in a radio cell to transmit user data to the network. The scheduling for all UEs is under control of the base station (e.g. eNB or gNB). The base station uses the uplink scheduling grant (e.g. in DCI) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

FIG. 1 illustrates an exemplary (and simplified) wireless communication system, according to some aspects. It is noted that the system of FIG. 1 is merely one example of a possible system, and aspects may be implemented in any of various systems, as desired.

As shown, the exemplary wireless communication system includes base stations 102A through 102N, also collectively referred to as base station(s) 102 or base station 102. As shown in FIG. 1, base station 102A communicates over a transmission medium with one or more user devices 106A through 106N. Each of the user devices may be referred to herein as a "user equipment" (UE) or UE device. Thus, the user devices 106A through 106N are referred to as UEs or UE devices, and are also collectively referred to as UE(s) 106 or UE 106. Various ones of the UE devices may implement solutions for multimedia and broadcast services reception and simultaneous operation with unicast reception, as disclosed herein.

The base station 102A may be a base transceiver station (BTS) or cell site, and may include hardware that enables wireless communication with the UEs 106A through 106N. The base station 102A may also be equipped to communicate with a network 100, e.g., a core network of a cellular service provider, a telecommunication network such as a public switched telephone network (PSTN), and/or the Internet, neutral host or various CBRS (Citizens Broadband Radio Service) deployments, among various possibilities. Thus, the base station 102A may facilitate communication between the user devices and/or between the user devices and the network 100. In particular, the cellular base station 102A may provide UEs 106 with various telecommunication capabilities, such as voice, SMS and/or data services. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases abase station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station(s) 102 and the user devices may be configured to communicate over the transmission medium using any of various radio access technologies (RATs), also referred to as wireless communication technologies, or telecommunication standards, such as GSM, UMTS (WCDMA), LTE. LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if a base station(s) 102 are implemented in the context of LTE, it may alternately be referred to as an 'eNodeB' or 'eNB'. Note that if the base station 102A is implemented in the context of 5G NR, it may alternately be referred to as 'gNodeB' or 'gNB'. In some aspects, the base station(s) 102 may implement signaling for provisioning positioning-resources requested via physical layer signaling by UEs, as described herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum and/or spectrum that was assigned to Citizens Broadband Radio Service (CBRS). Overall, the use of various terms and expressions will always be clearly indicated with respect to and within the context of the various applications/aspects under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services. Base station 102A and other similar base stations (such as base stations 102B . . . 102N) operating according to the same or a different cellular communication standard may thus be provided as a network of cells, which may provide continuous or nearly continuous overlapping service to UEs 106A-106N and similar devices over a geographic area via one or more cellular communication standards.

Thus, while base station 102A may act as a "serving cell" for UEs 106A-106N as illustrated in FIG. 1, each one of UE(s) 106 may also be capable of receiving signals from (and possibly within communication range of) one or more other cells (which might be provided by base stations 1028-102N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-102B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB". In some aspects, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

As mentioned above, UE(s) 106 may be capable of communicating using multiple wireless communication standards. For example, a UE might be configured to communicate using any or all of a 3GPP cellular communication standard (such as LTE or NR) or a 3GPP2 cellular communication standard (such as a cellular communication standard in the CDMA2000 family of cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE(s) 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, UE(s) 106 may also communicate with Network 100, through one or more base stations or through other devices, stations, or any appliances not explicitly shown but considered to be part of Network 100. UE(s) 106 communicating with a network may therefore be interpreted as the UEs 106 communicating with one or more network nodes considered to be a part of the network and which may interact with the UE(s) 106 to conduct communications with the UE(s) 106 and in some cases affect at least some of the communication parameters and/or use of communication resources of the UE(s) 106.

Furthermore, as also illustrated in FIG. 1, at least some of the UE(s) 106, e.g. 106D and 106E may represent vehicles communicating with each other and with base station 102A, via cellular communications such as 3GPP LTE and/or 5G-NR for example. In addition, UE 106F may represent a pedestrian who is communicating and/or interacting with the vehicles represented by UEs 106D and 106E in a similar manner. Further aspects of vehicles communicating in a network exemplified in FIG. 1 are disclosed in the context of vehicle-to-everything (V2X) communications such as the communications specified by 3GPP TS 22.185 V 14.3.0, among others.

FIG. 2 illustrates an exemplary user equipment 106 (e.g., one of the devices 106A through 106N) in communication with the base station 102 and an access point 112, according to some aspects. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the methods described herein by executing such stored instructions. Alternatively, or in addition, the UE 106 may include a programmable hardware element such as an FPGA (field-programmable gate array) that is configured to perform any of the methods described herein, or any portion of any of the methods described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards, .g. those previously mentioned above. In some aspects, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios or radio circuitry which are shared between multiple wireless communication protocols, and one or more radios which are used exclusively by a single wireless communication protocol. For example, the UE 106 may include a shared radio for communicating using either of LTE or CDMA2000 1×RTT or NR, and separate radios for communicating using each of Wi-Fi and BLUETOOTH™. Other configurations are also possible.

Figure 3:
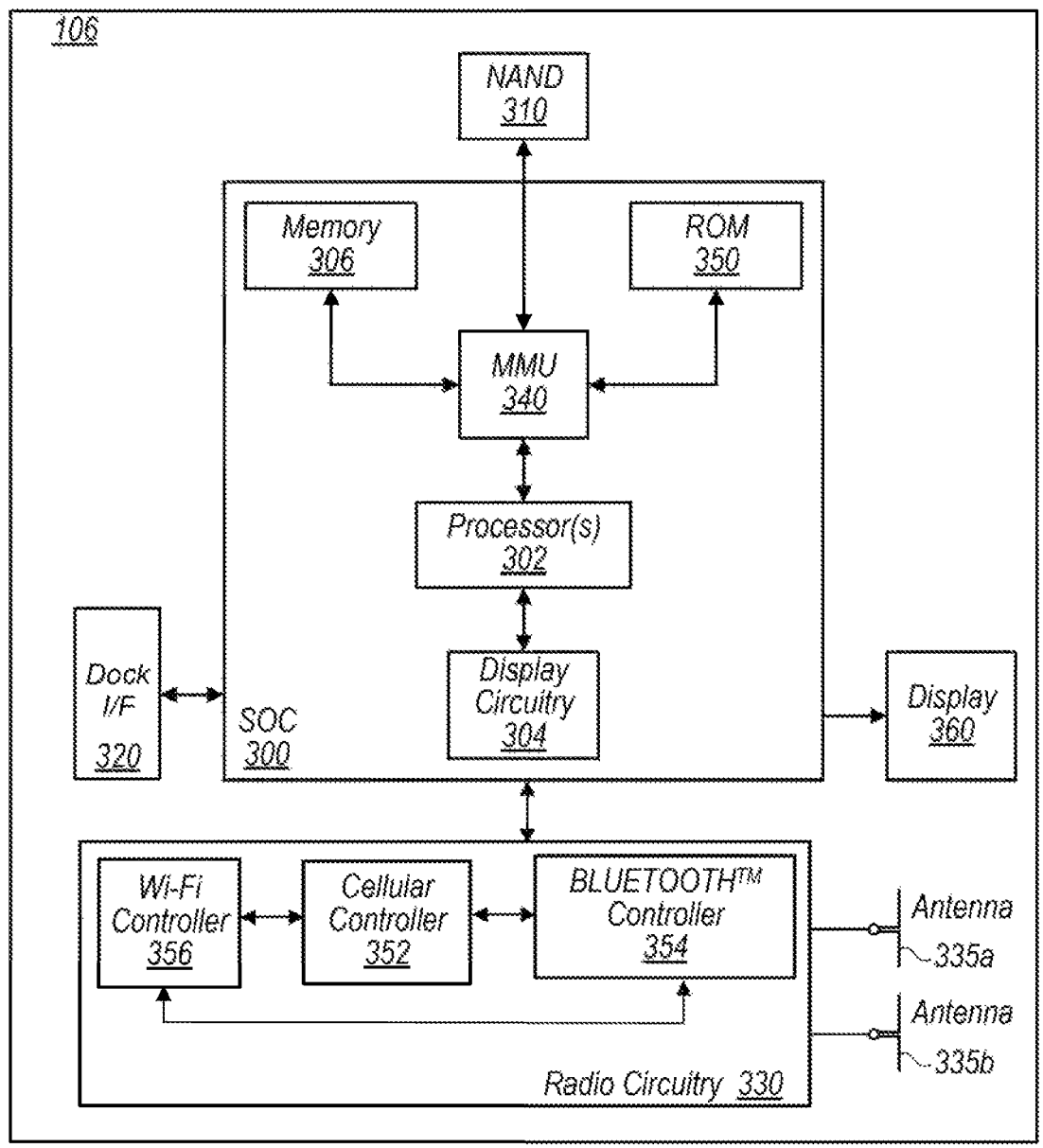
FIG. 3 illustrates an exemplary block diagram of a UE, according to some aspects.

FIGS. 3—Block Diagram of an Exemplary UE

FIG. 3 illustrates a block diagram of an exemplary UE 106, according to some aspects. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some aspects, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some aspects.

As further described herein, the UE 106 (and/or base station(s) 102) may include hardware and software components for operating using control signaling that enhances the reliability of physical control channel (e.g. PDSCH) transmission and reception, as further detailed herein. The processor(s) 302 of the UE device 106 may be configured to implement part or all of the methods described herein, e.g., by executing program instructions stored on a memory medium (e.g., a non-transitory computer-readable memory medium). In other aspects, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement multimedia and broadcast services reception and simultaneous operation with unicast reception according to various aspects disclosed herein. Processor(s) 302 may also implement various other applications and/or end-user applications running on UE 106.

Figure 5:
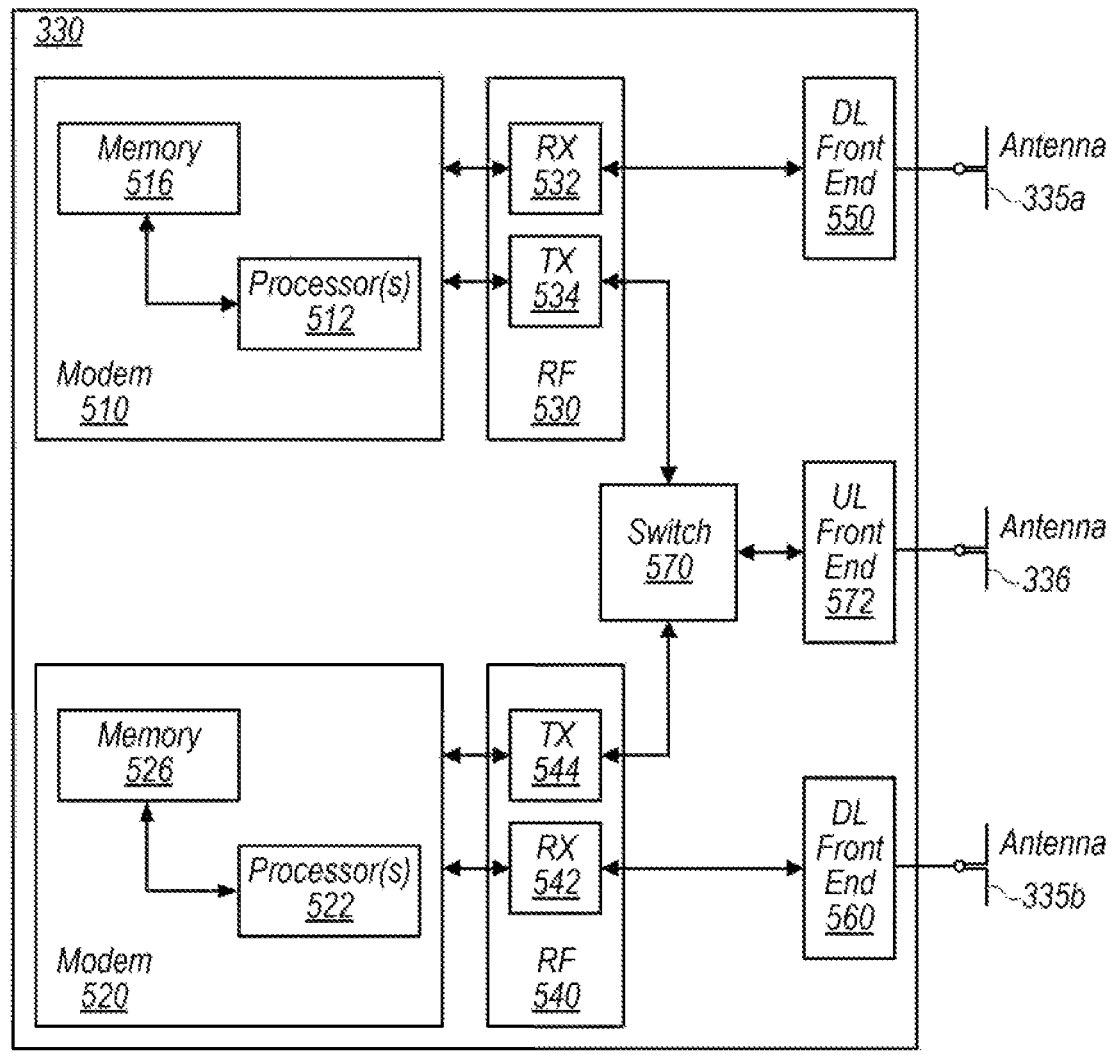
FIG. 5 shows an exemplary simplified block diagram illustrative of cellular communication circuitry, according to some aspects.

In some aspects, radio circuitry 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some aspects, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other aspects have fewer or more similar controllers for various different RATs that may be implemented in UE device 106. For example, at least one exemplary block diagram illustrative of some aspects of cellular controller 352 is shown in FIG. 5 and will be further described below.

Figure 4:
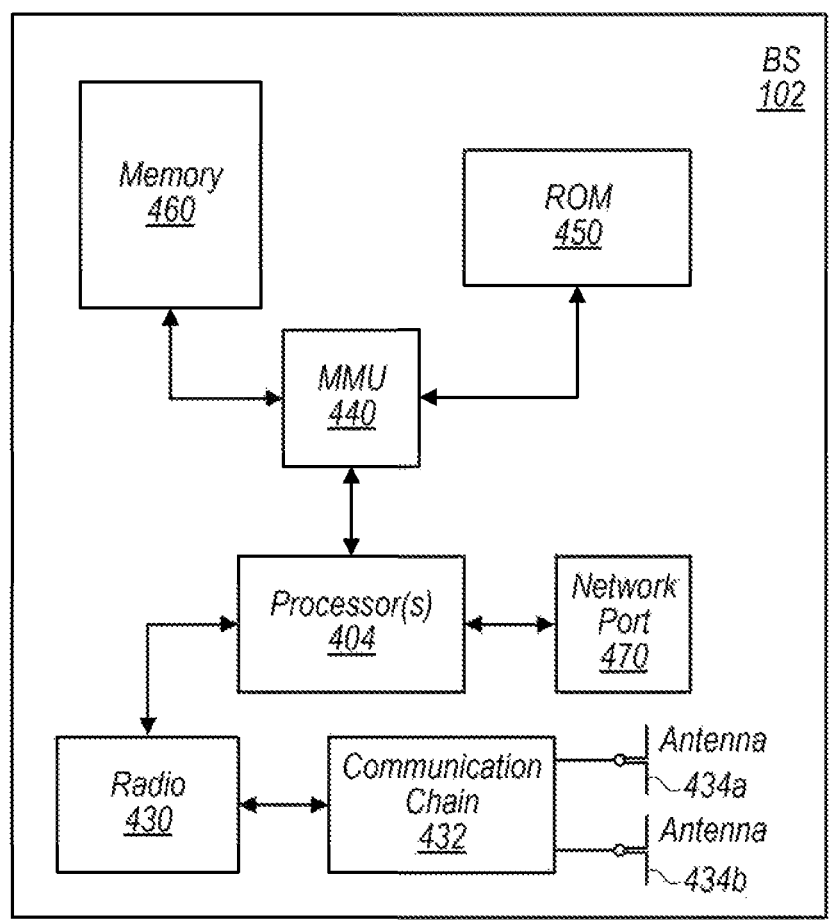
FIG. 4 illustrates an exemplary block diagram of a base station, according to some aspects.

FIG. 4—Block Diagram of an Exemplary Base Station

FIG. 4 illustrates a block diagram of an exemplary base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas, (e.g. illustrated by antennas 434a and 434b) for performing wireless communication with mobile devices and/or other devices. Antennas 434a and 434b are shown by way of example, and base station 102 may include fewer or more antennas. Overall, the one or more antennas, which may include antenna 434a and/or antenna 434b, are collectively referred to as antenna(s) 434. Antenna(s) 434 may be configured to operate as a wireless transceiver and may be further configured to communicate with UE devices 106 via radio circuitry 430. The antenna(s) 434 may communicate with the radio circuitry 430 via communication chain 432. Communication chain 432 may be a receive chain, a transmit chain or both. The radio circuitry 430 may be designed to communicate via various wireless telecommunication standards, including, but not limited to, LTE, LTE-A, 5G-NR (or NR for short), WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to implement signaling for provisioning positioning-resources requested via physical layer signaling by UEs, as disclosed herein. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods and aspects thereof as disclosed herein to implement multimedia and broadcast services reception and simultaneous operation with unicast reception.

FIG. 5—Block Diagram of Exemplary Cellular Communication Circuitry

FIG. 5 illustrates an exemplary simplified block diagram illustrative of cellular controller 352, according to some aspects. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some aspects, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some aspects, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. U L front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some aspects, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some aspects, the cellular communication circuitry 352 may also not include the switch 570, and the RF front end 530 or the RF front end 540 may be in communication, e.g., directly, with the UL front end 572.

Multimedia Broadcast and Multicast Services Reception

Multicast and Broadcast Services (MBS) or Multimedia Broadcast and Multicast Services (MBMS) refers to a point-to-multipoint communication scheme in which data packets are simultaneously transmitted from a single source to multiple destinations. Broadcast refers to content delivery to all users, while multicast refers to content distribution among a specific group of users subscribed to a given multicast service. The geographical area over which multicast and broadcast content is transmitted is referred to as a zone. An MBS zone is typically a collection of one or more base stations transmitting the same content, and each MBS-service-capable base station may belong to one or more MBS zones, each MBS zone identified by a unique zone identifier. A mobile station (or UE) can receive MBS content within an MBS zone when the UE is in connected state (e.g. RRC connected state). UEs in an MBS zone are typically assigned a common multicast station identifier. In contrast, unicast reception refers to transmissions intended for a single device or UE.

In 3GPP Long Term Evolution (LTE), during MBMS point-to-multipoint (PTM) transmission the UE receives the MBMS service via the same frequencies regardless of the radio resource control (RRC) state of the UE. For example, reception of MBMS PTM transmissions may be the same whether the UE is in connected state or idle state. In 3GPP New Radio (NR), the cell may be a wideband cell divided into multiple bandwidth parts (BWPs), e.g. 4 BWPs, with the UE communicating over one BWP at a time per serving cell. Therefore, there is a need for defining how the NW (e.g. base station) may provide MBMS transmissions and possibly unicast transmissions at the same time to a UE that is in a connected state (also referred to as connected UE) in the NR wideband cell, and how to allocate and use frequencies during MBMS and unicast transmissions.

MBMS-Specific BWP for MBMS-PTM Transmission

In some aspect, the network (e.g. base station; gNB) may configure an MBMS-specific BWP for the UE for the PTM transmissions per serving cell. For example, in case the UE operates using multiple serving cells, or multiple cells serve the UE, a respective MBMS-specific BWP for PTM transmissions to the UE may be configured for each cell. As previously mentioned, a UE may be configured with up to a specified number (e.g. four) of BWPs, and the allocation of one of those BWPs specifically for MBMS-specific PTM transmissions may therefore impact BWP usage of the UE. Multiple different options may be possible for the UE to support a specified number (e.g. a maximum number) of BWPs. Three possible options are listed below. It should be noted that the specific numbers are provided by way of example to reflect practical implementations relating to proposed standards, but the number of BWPs may be adapted according to the various aspects disclosed herein.

Option 1: The UE may support four (4) dedicated BWPs plus an additional MBMS-specific BWP per serving cell;

Option 2: The UE may support four (4) dedicated BWPs per serving cell plus an additional MBMS-specific BWP on either the PCell or PSCell; and Option 3: The UE may support four (4) dedicated BWPs, inclusive of the MBMS-specific BWP.

The MBMS-specific BWP may be used for DL transmissions, and may be cell-specific or UE-specific per serving cell. It should be noted that in case the UE is capable of simultaneously receiving MBMS transmissions and unicast transmissions, the unicast BWP and MBMS-specific BWP allocated to the UE may both be active at the same time. In other words, in this sense the UE may actually operate over two active BWPs at a time, but one BWP may be dedicated to unicast transmissions while the other BWP may be dedicated to MBMS transmissions.

Some aspects of the operation of a UE that supports an MBMS-specific BWP are as follows. The UE may receive the all the MBMS services via PTM in the MBMS-specific BWP for one serving cell. The UE may provide information with an indication of the radio quality of the MBMS-specific BWP to the NW (e.g. to a base station), for example via a Channel State Information (CSI) report such as a layer 1, or L1, CSI report, or via a measurement report such as a layer 3, or L3, measurement report. The network (e.g. a base station) may then adjust resources for subsequent MBMS PTM transmissions as required, based on the information provided by the UE. The UE may stop and start the MBMS PTM reception on the MBMS-BWP based at least on one or more of the scenarios:

The UE receiving an explicit indication (e.g. via L1, or L2, i.e. layer 2 signaling) via a common command from the network (e.g. from a base station) to start or stop reception of MBMS PTM transmissions—the common command may itself be transmitted via a PTM transmission and may be received by multiple UEs;

The UE receiving an explicit indication via a LIE-specific command from the network (e.g. from a base station) to start or stop reception of MBMS PTM transmissions—the a UE-specific command may be specifically intended for the UE in contrast to the common command described above; or The LIE may determine which of the MBMSs to receive, and may start or stop reception of specific MBMS PTM transmissions accordingly—for example, there may be multiple MBMSs provided via the PTM transmissions on the MBMS-specific BWP, and the LIE may autonomously determine which, if any of those to receive.

In some instances, the UE may not have the capability to simultaneously receive unicast transmissions, e.g. via a UE-dedicated BWP, and MBMS PTM transmissions, e.g. via the MBMS-specific BWP. In such cases the UE may operate as follows, according to some aspects:

The UE may perform the reception of the unicast transmission and PTM transmission according to time division multiplexing (TDM), which may be configured by the network (e.g. by a base station);

The UE may prioritize to receive the unicast transmission, and may also receive the PTM transmission when no unicast transmissions are taking place;

The UE may stop operating on (or may stop using) the MBMS-specific BWP and rely on the network (e.g. a base station) scheduling the MBMS transmission via a peer-to-peer (PTP) transmission to the UE; or The UE may provide information indicating a potential collision (between unicast and PTM transmission) and/ or a preferred TDM pattern to the network (e.g. to a base station).

Figure 6:
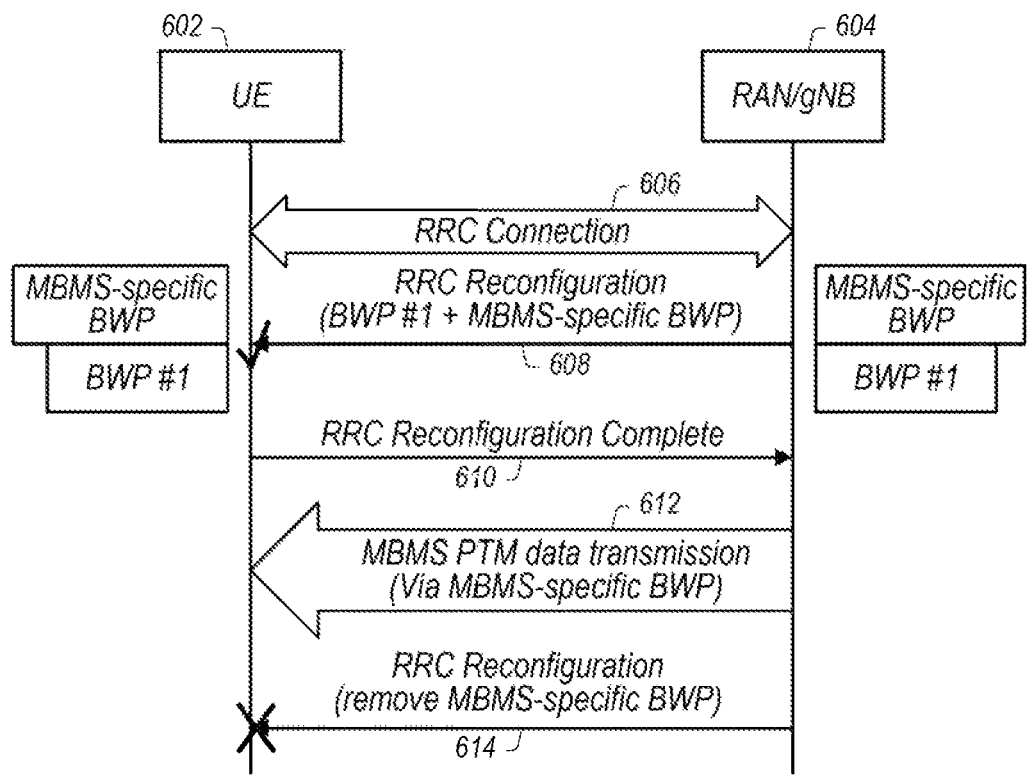
FIG. 6 illustrates a first example of wireless communications in which an MBMS-specific BWP is allocated for MBMS-PTM transmissions, according to some aspects.

FIG. 6 illustrates a first example of wireless communications in which an MBMS-specific BWP is allocated to a UE for MBMS-PTM transmissions. In the first example, the UE may start and stop reception of MBMS PTM transmissions over the MBMS-specific BWP as configured via RRC by the network (e.g. by a base station). The network (e.g. a base station) may provide the MBMS PTM transmission and scheduling configuration over (on) the MBMS-specific BWP, and may also provide the MBMS related configuration (e.g. L2 configuration) information to the UE via RRC signaling. As illustrated in FIG. 6, once RRC connection between UE 602 and base station 604 has been established (as indicated by 606), the base station 604 may configure/ allocate an MBMS-specific BWP for UE 602, and may also configure/allocate BWP #1 for other communications, e.g. unicast transmissions, of the UE (as indicated by 608). The UE 602 may inform base station 604 that the reconfiguration is complete (as indicated by 610), and may subsequently begin receiving the MBMS PTM transmission(s) via the MBMS-specific BWP (as indicated by 612). The UE may stop reception once base station 604 reconfigures the LE 602 to remove the MBMS-specific BWP (as indicated by 614).

Figure 7:
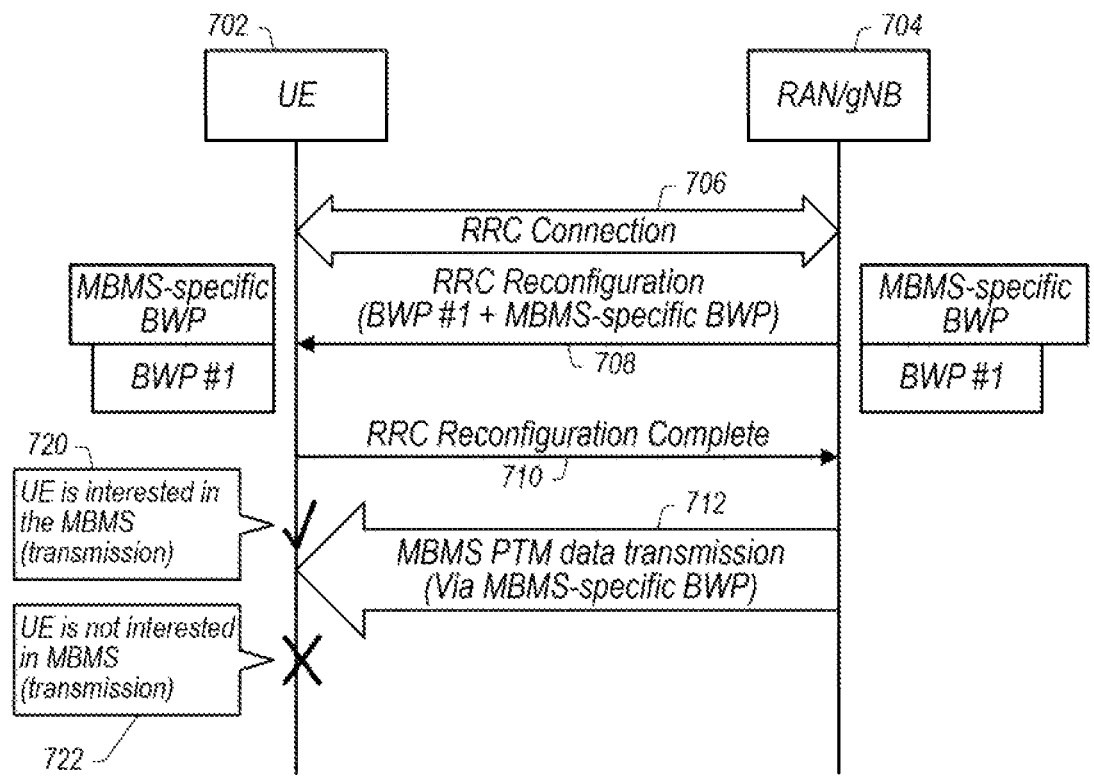
FIG. 7 illustrates a second example of wireless communications in which an MBMS-specific BWP is allocated for MBMS-PTM transmissions, according to some aspects.

FIG. 7 illustrates a second example of wireless communications in which an MBMS-specific BWP is allocated for MBMS-PTM transmission. In the second example, the UE may start and stop reception of MBMS PTM transmissions over the MBMS-specific BWP autonomously, according to a determination by the UE whether the UE has interest in a specific MBMS. The network (e.g. base station) may provide to the UE all the MBMS information that is of interest to the UE, and the UE may autonomously start or stop reception on the MBMS-specific BWP based on its (the UE's) interest. As illustrated in FIG. 7, once RRC connection between IE 702 and base station 704 has been established (as indicated by 706), the base station 704 may configure/allocate an MBMS-specific BWP for UE 702, and may also configure/allocate BWP #1 for other communications, e.g. unicast transmissions, of the UE (as indicated by 708). The UE 702 may inform base station 704 that the reconfiguration is complete (as indicated by 710). Subsequently, the base station 704 may perform MBMS PTM transmission(s) via the MBMS-specific BWP (as indicated by 712), which the UE may receive when the UE is interested in the MBMS (as indicated by 720). When the UE is not interested in the MBMS, it may not receive the MBMS PTM transmission(s)(as indicated by 722).

Figure 8:
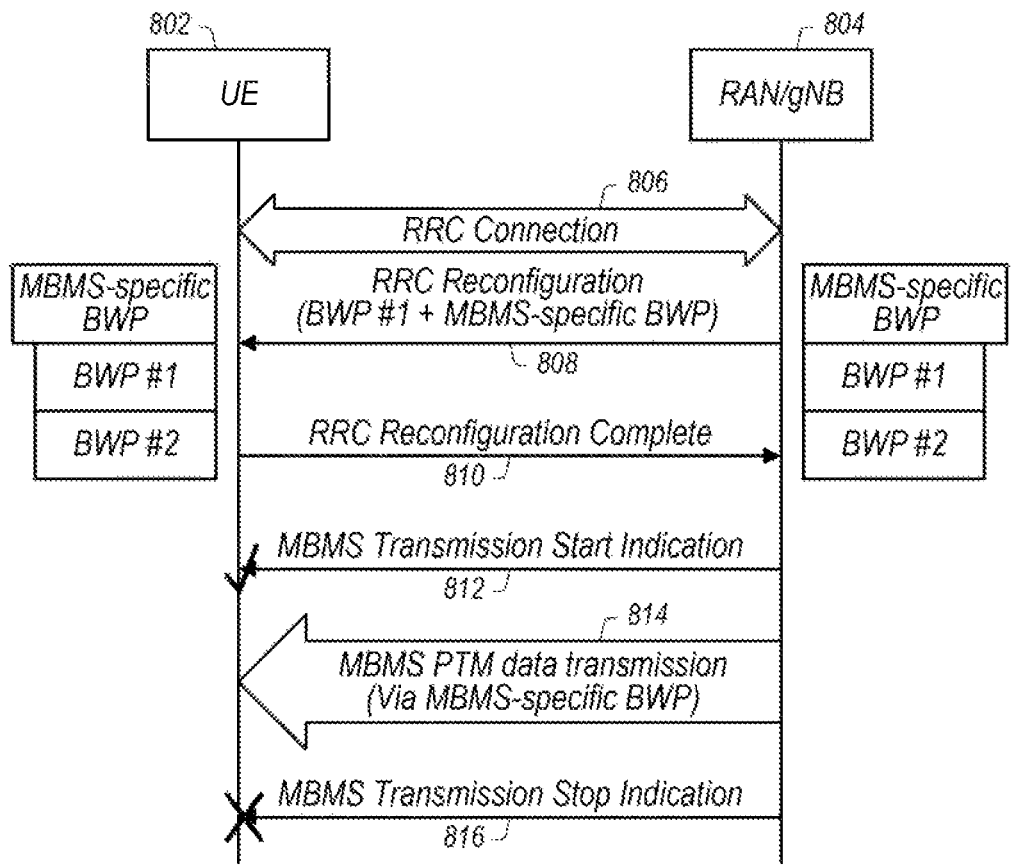
FIG. 8 illustrates a third example of wireless communications in which an MBMS-specific BWP is allocated for MBMS-PTM transmissions, according to some aspects.

FIG. 8 illustrates a third example of wireless communications in which an MBMS-specific BWP is allocated for MBMS-PTM transmission. In the third example, the UE may start and stop reception of MBMS PTM transmissions over the MBMS-specific BWP according to a UE-specific command or indication (e.g. L1 or L2 command/indication) from the network (e.g. from a base station), in contrast to a fourth example (described in further detail below) in which a common command intended for multiple UEs is used for this purpose. Information indicative of the start and stop of the MBMS PTM transmission(s) may be provided by the network (e.g. a base station) to the UE based on the UE radio quality, and/or based on conditions associated with data reception of the UE, for example the block error rate (BLER) for MBMS PTM or unicast data reception. The information relating to the start and stop of the MBMS PTM transmission(s) may be transmitted by the base station via an activated unicast BWP or via the MBMS-specific BWP as a transmission specifically intended for the UE. As illustrated in FIG. 8, once RRC connection between UE 802 and base station 804 has been established (as indicated by 806), the base station 804 may configure/allocate an MBMS-specific BWP for UE 802, and may also configure/allocate BWP #1 and BWP #2 for other UE-dedicated unicast communications, e.g. at least one of BWP #1 or BWP #2 may be allocated for unicast transmissions of the UE (as indicated by 808). The UE 802 may inform base station 804 that the reconfiguration is complete (as indicated by 810). Subsequently, the base station 804 may inform the UE via UE-specific signaling of the start of the MBMS transmission, either via the MBMS-specific BWP or via one of BWP #1 or BWP #2 (as indicated by 812). The base station may then perform MBMS PTM transmission(s) via the MBMS-specific BWP (as indicated by 814), and may inform the UE via UE-specific signaling of the stop of the MBMS transmission, either via the MBMS-specific BWP or via one of BWP #1 or BWP #2 (as indicated by 816).

Figure 9:
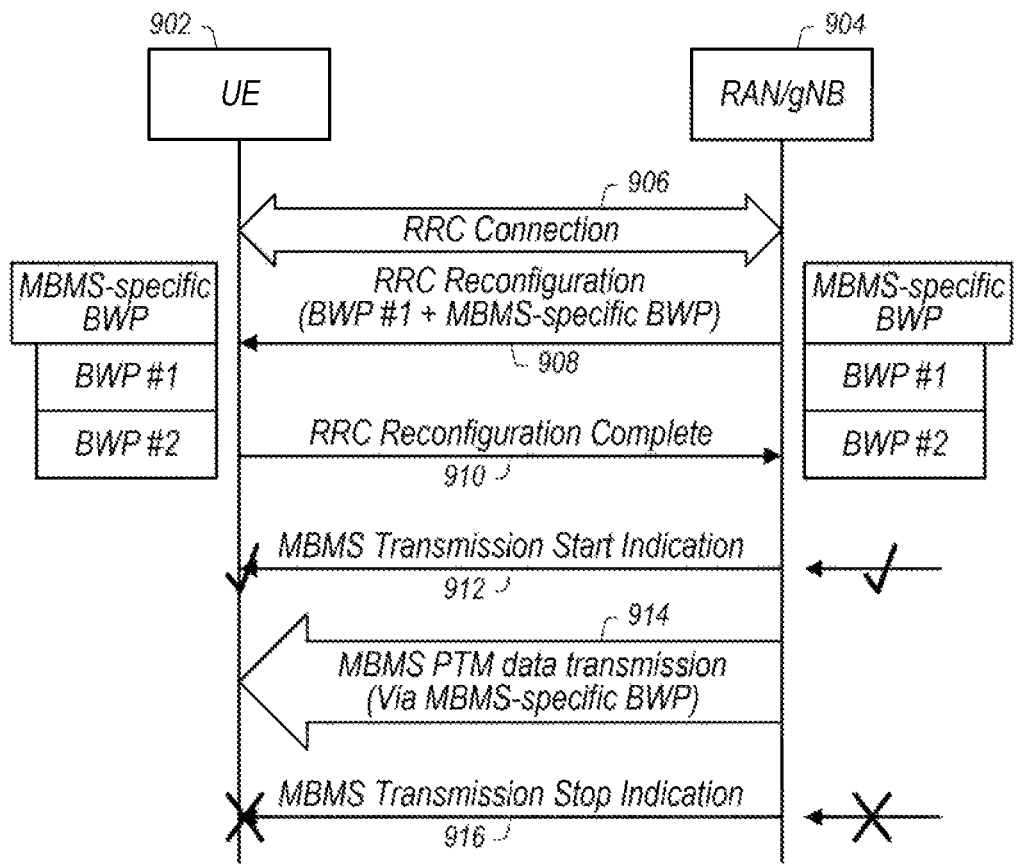
FIG. 9 illustrates a fourth example of wireless communications in which an MBMS-specific BWP is allocated for MBMS-PTM transmissions, according to some aspects.

FIG. 9 illustrates a fourth example of wireless communications in which an MBMS-specific BWP is allocated for MBMS-PTM Transmission. In the fourth example, the UE may start and stop reception of MBMS PTM transmissions over the MBMS-specific BWP according to a common command or indication from the network (e.g. from a base station), in contrast to the third example (described above) in which a UE-specific command intended for the single UE is used for this purpose. The network (e.g. a base station) may provide the common command or indication when the core network suspends or resumes the MBMS transmission(s). The common command/indication may be transmitted via the MBMS-specific BWP. As illustrated in FIG. 9, once RRC connection between UE 902 and base station 904 has been established (as indicated by 906), the base station 904 may configure/allocate an MBMS-specific BWP for UE 902, and may also configure/allocate BWP #1 and BWP #2 for other communications, e.g. at least one of BWP #1 or BWP #2 may be allocated for unicast transmissions of the UE (as indicated by 908). The UE 902 may inform base station 904 that the reconfiguration is complete (as indicated by 910). Subsequently, the base station 804 may inform the UE via a common command/signaling over the MBMS-specific BWP of the start of the MBMS transmission (as indicated by 912). The base station may then perform MBMS PTM transmission(s) via the MBMS-specific BWP (as indicated by 914), and may inform the UE via a common command over the MBMS-specific BWP of the stop of the MBMS transmission (as indicated by 916).

Figure 10:
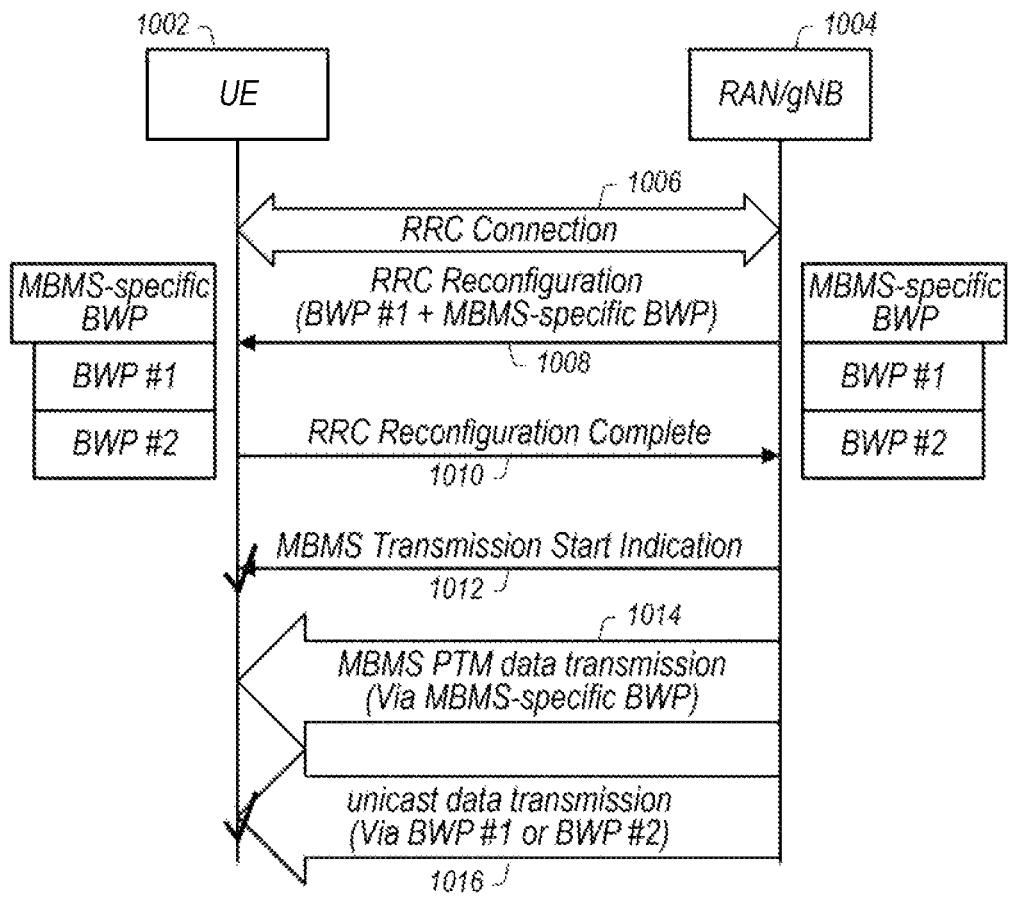
FIG. 10 illustrates a fifth example of wireless communications in which an MBMS-specific BWP is allocated for MBMS-PTM transmissions, according to some aspects.

FIG. 10 illustrates a fifth example of wireless communications in which an MBMS-specific BWP is allocated for MBMS-PTM Transmission. In the fifth example, the UE is capable of simultaneous reception over (on) two different BWPs, and the communications illustrated in FIG. 10 include simultaneous reception on the MBMS-specific BWP and on a unicast BWP. When the UE is capable of simultaneous reception on two BWPs, the UE may receive both the MBMS and unicast transmissions simultaneously, or at least partially simultaneously, for example at times when portions of the two different (MBMS and unicast) transmissions overlap. The UE may report this capability to the network (e.g. to a base station), and may also report additional information pertaining to this capability. For example, the UE may send information to the base station indicating whether the UE can support simultaneous reception on an MBMS-specific BWP and another BWP with the same subcarrier spacing or with different subcarrier spacing. In some aspect, the UE may provide this additional information in the Access Stratum (AS) radio quality report transmitted by the UE to the base station. In case the UE does not transmit this additional information to the base station, the base station may operate under the assumption that if the subcarrier spacing of the MBMS-specific BWP is different from the subcarrier spacing of the other (e.g. UE-dedicated or UE-specific allocated unicast) BWP, then the UE cannot simultaneously receive over (on) both the MBMS-specific BWP and the allocated unicast BWP. As illustrated in FIG. 10, once RRC connection between UE 1002 and base station 1004 has been established (as indicated by 1006), the base station 1004 may configure/allocate an MBMS-specific BWP for UE 1002, and may also configure/allocate BWP #1 and BWP #2 for other communications. e.g. at least one of BWP #1 or BWP #2 may be allocated for unicast transmissions of the UE (as indicated by 100g). The UE 1002 may inform base station 1004 that the reconfiguration is complete (as indicated by 1010). Subsequently, the base station 1004 may inform the UE of the start of the MBMS transmission (as indicated by 1012). The base station may then perform MBMS PTM transmission(s) via the MBMS-specific BWP (as indicated by 1014), and may also simultaneously perform unicast transmission(s) to the UE over the BWP (BWP #1 or BWP #2) allocated for unicast transmissions (as indicated by 1016).

Figure 11:
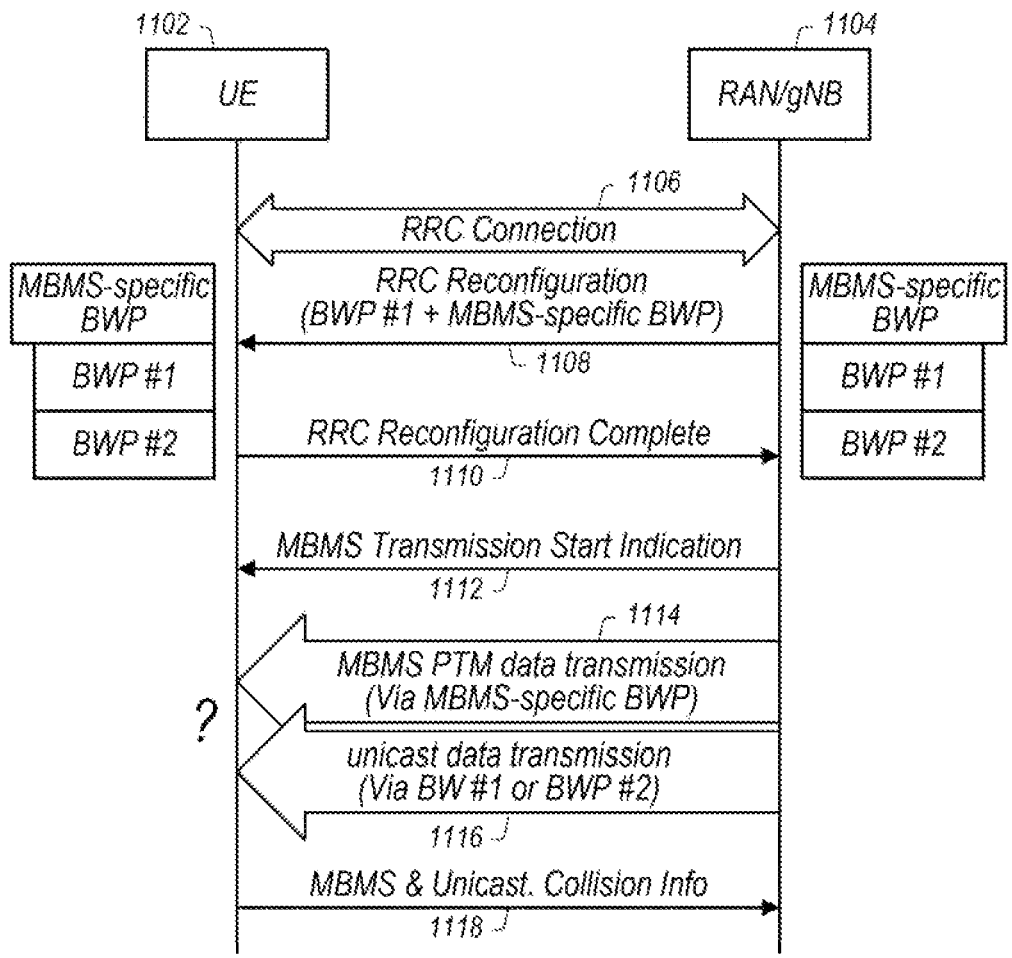
FIG. 11 illustrates a sixth example of wireless communications in which an MBMS-specific BWP is allocated for MBMS-PTM transmissions, according to some aspects.

FIG. 11 illustrates a sixth example of wireless communications in which an MBMS-specific BWP is allocated for MBMS-PTM Transmission. In the sixth example, the UE is not capable of simultaneous reception over (on) two different BWPs, and the communications illustrated in FIG. 11 include prioritizing either the MBMS transmission over the unicast transmission or the unicast reception over the MBMS transmission in case of a collision (e.g. attempted simultaneous transmission of the MBMS and unicast transmissions). When the UE cannot support the simultaneous transmission of MBMS and unicast data, the UE may determine whether to first perform MBMS reception or unicast reception based on prioritization, for example according to prioritization configured by the network (e.g. by a base station). In some aspects, the UE may check respective transmission patterns corresponding to the MBMS and unicast transmissions to determine which transmission to receive first. For example, the UE may check the unicast discontinuous reception (DRX) pattern and the MBMS scheduling pattern. When the MBMS reception is prioritized, the UE may first perform the reception according to the MBMS scheduling pattern. When the unicast reception is prioritized, the UE may first follow the DRX pattern to perform the unicast reception, and may then perform the MBMS reception when the UE is in a DRX off state. The UE may also provide the collision information to the network (e.g. to a base station). As illustrated in FIG. 11, once RRC connection between UE 1102 and base station 1104 has been established (as indicated by 1106), the base station 1104 may configure/allocate an MBMS-specific BWP for UE 1102, and may also configure/allocate BWP #1 and BWP #2 for other communications, e.g. at least one of BWP #1 or BWP #2 may be allocated for unicast transmissions of the UE (as indicated by 1108). The UE 1102 may inform base station 1104 that the reconfiguration is complete (as indicated by 1110). Subsequently, the base station 1104 may inform the UE 1102 of the start of the MBMS transmission (as indicated by 1112). The base station may then perform MBMS PTM transmission(s) via the MBMS-specific BWP (as indicated by 1114), and may also perform unicast transmission(s) to the UE over the BWP (BWP #1 or BWP #2) allocated for unicast transmissions (as indicated by 1116). In some aspects UE 1102 may transmit collision information indicative of a potential collision (between MBMS data transmissions and unicast data transmission) to the base station 1104 (as indicated by 1118). Responsive to receiving the collision information from UE 1002, base station 1004 may schedule unicast transmission(s) to UE 1002 based on the collision information in order to avoid the collision.

Figure 12:
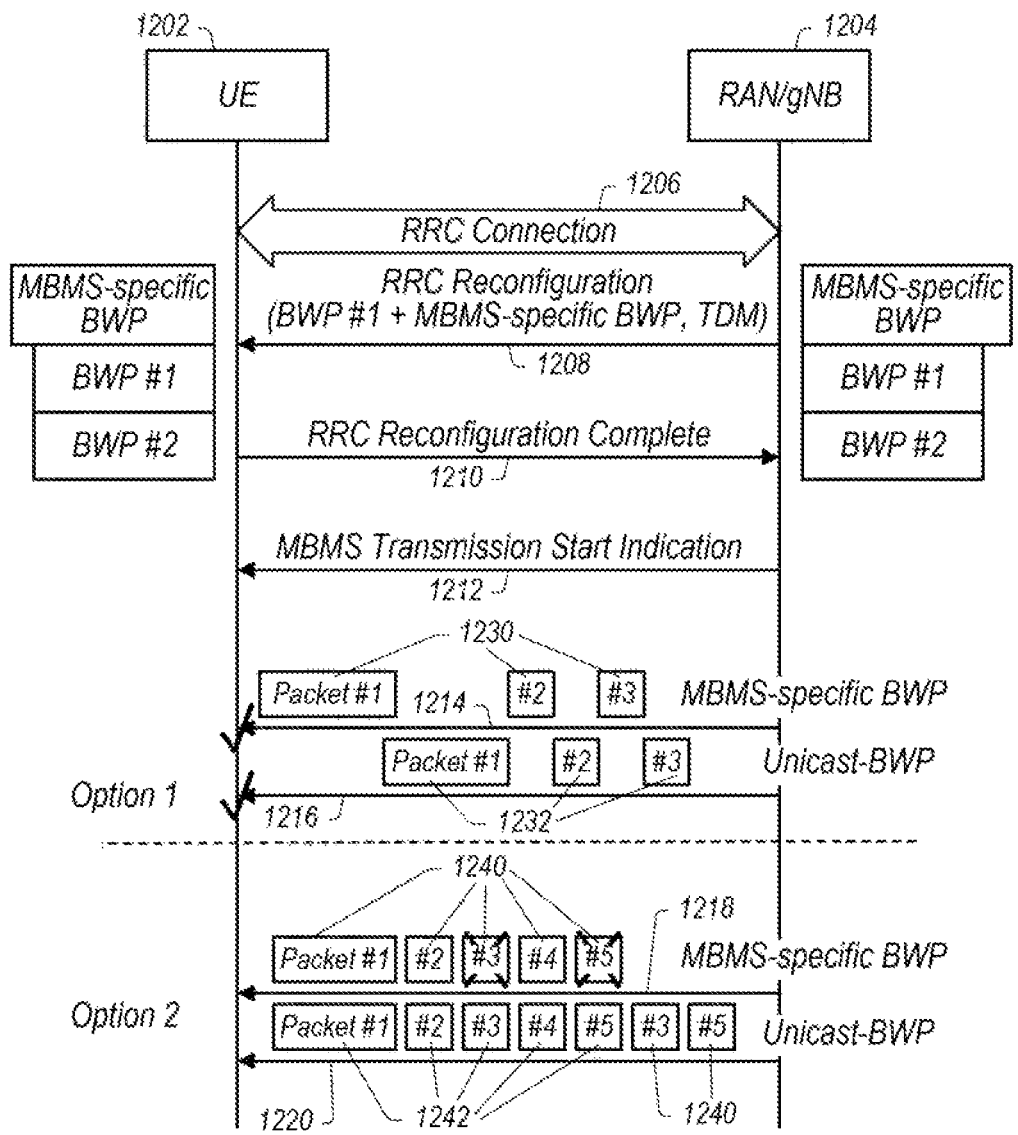
FIG. 12 illustrates a seventh example of wireless communications in which an MBMS-specific BWP is allocated for MBMS-PTM transmissions, according to some aspects.

FIG. 12 illustrates a seventh example of wireless communications in which an MBMS-specific BWP is allocated for MBMS-PTM Transmission. In the seventh example, the MBMS and unicast transmissions may be performed in a time division multiplexed (TDM) manner. The network (e.g. a base station) may configure a TDM pattern for MBMS and unicast transmission for the UE to follow. In some aspects, the UE may also provide a TDM pattern suggestion to the base station for the base station to configure the TDM pattern. The UE may then receive the MBMS and unicast transmissions according to the configured TDM pattern. In some cases, the MBMS PTM transmission may be intended for UEs having different respective capabilities, with some of the UEs capable of simultaneous reception of MBMS transmissions and unicast transmissions and other UEs not capable of such simultaneous reception. In such cases, a network (e.g. a base station) configured TDM pattern may be appropriate for certain UEs but not for other UEs. In cases when the base station performs the MBMS PIM data transmission according to a configured TDM pattern to accommodate UEs lacking the capability of continuously receiving MBMS PTM data transmissions (e.g. because the UEs lack the capability of simultaneous MBMS PTM and unicast data transmissions), other UEs, also served by the base station and having the capability of continuously receiving MBMS PTM data transmissions, may have some gaps or free periods during the MBMS PTM transmission periods when no MBMS data is transmitted (per the TDM pattern). However, when the base station performs continuous MBMS PTM data transmissions (e.g. without any gaps) to accommodate UEs having the capability of continuously receiving MBMS PTM data transmissions, other UEs, also served by the base station and lacking the capability of continuously receiving MBMS PTM data transmissions, may fail to receive some of the data that was transmitted during the MBMS PTM transmission. In such cases the base station may retransmit the non-received MBMS data over a unicast transmission as will be further detailed below. As illustrated in FIG. 12, once RRC connection between UE 1202 and base station 1204 has been established (as indicated by 1206), the base station 1204 may configure/allocate an MBMS-specific BWP for UE 1202, may also configure/allocate BWP #1 and BWP #2 for other communications, e.g. at least one of BWP #1 or BWP #2 may be allocated for unicast transmissions of the UE, and may also configure a TDM transmission pattern for MBMS transmissions and unicast transmissions (as indicated by 1208). The UE 1202 may inform base station 1204 that the reconfiguration is complete (as indicated by 1210). Subsequently, the base station 1204 may inform the UE 1202 of the start of the MBMS transmission (as indicated by 1212). According to a first option (primarily accommodating UEs lacking the capability of continuously receiving MBMS PTM data transmissions), the base station 1204 may transmit the MBMS packets 1230 over the MBMS-specific BWP, and the unicast packets 1232 over a unicast BWP allocated for unicast transmissions according to the configured TDIM pattern (as indicated by 1214 and 1216, respectively.) According to a second option, (primarily accommodating UEs capable of continuously receiving MBMS PTM data transmissions), the base station 1204 may transmit the MBMS packets 1240 over the MBMS-specific BWP without gaps, and the unicast packets 1242 over a unicast BWP allocated for unicast transmissions. However, for UEs lacking the capability of continuously receiving MBMS PTM data transmissions, the base station 1204 may also use a PTP unicast transmission on the unicast BWP to transmit the MBMS packets #3 and #5 (of MBMS packets 1240), which were not received by UE 1202 via the PTP transmissions on the MBMS-specific BWP. In a way, the base station 1204 may thus retransmit MBMS packets #3 and #5 (of MBMS packets 1240) over the unicast BWP in recognition that the UE did not receive those packets over the MBMS-specific BWP (as indicated by 1218 and 1220, respectively.)

Figure 13:
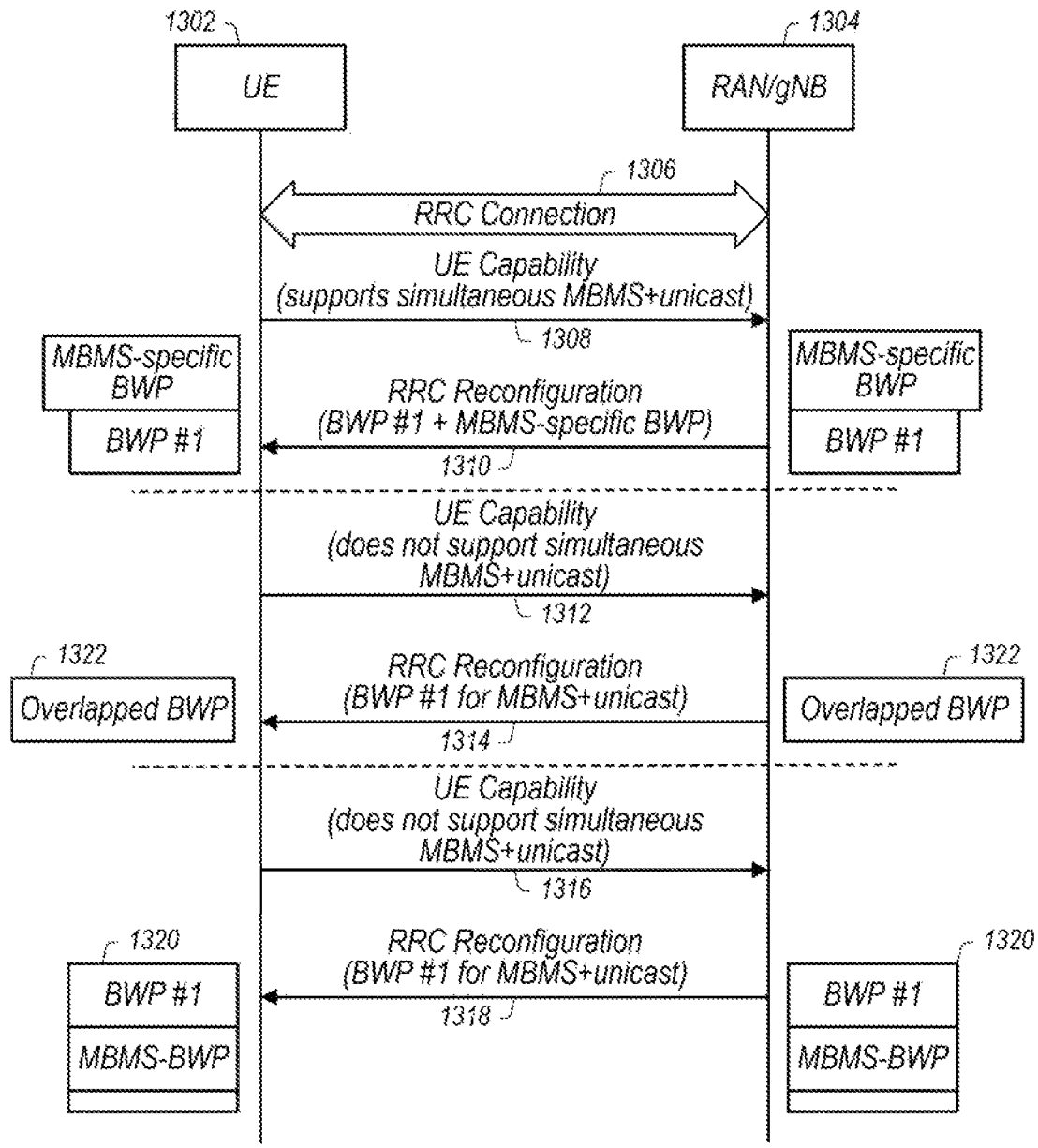
FIG. 13 illustrates an eighth example of wireless communications in which an MBMS-specific BWP is allocated for MBMS-PTM transmissions, according to some aspects.

FIG. 13 illustrates an eighth example of wireless communications in which an MBMS-specific BWP is allocated for MBMS-PTM Transmission. In the eighth example, the NW (e.g. a base station) may allocate the MBMS-specific BWP according to the capability of the UE. In other words, the base station may use information indicative of the capability of the UE to determine on which BWP to transmit MBMS packets and whether a separate MBMS-specific BWP may be allocated. In case the UE cannot support simultaneous MBMS and unicast reception on non-overlapped different BWPs, the network may optionally provide one of the following configurations for respective transmission of MBMS packets and unicast packets.

Option 1: The MBMS BWP (the BWP on which MBMS packets are transmitted) may be overlapped with the unicast BWP;

Option 2: The same BWP may be used for MBMS transmission and unicast transmission, in which case the MBMS BWP may be embedded in or may be a part of the BWP allocated for unicast transmissions; or Option 3: No MBMS BWP is allocated and MBMS packets are transmitted via unicast peer-to-peer (PTP) transmission(s).

Communications performed according to the three options described above are illustrated in FIG. 13. First, RRC connection between UE 1302 and base station 1304 may be established (as indicated by 1306). According to Option 1, the UE 1302 may signal to base station 1304 that the UE has the capability to simultaneously receive MBMS and unicast transmissions. For example, the UE 1302 may send information to base station 1304 to indicate this capability (as indicated by 1308). The base station 1304 may in response reconfigure the UE 1302, allocating an MBMS-specific BWP for UE 1302 and also allocating BWP #1 for other communications, e.g. for unicast transmissions of the UE 1302 (as indicated by 1310). According to Option 2, the UE 1302 may inform base station 1304 that the UE does not have the capability to simultaneously receive MBMS and unicast transmissions (as indicated by 1312). The base station 1304 may in response reconfigure UE 1302, overlapping the MBSM BWP and BWP #1 and allocating the overlapped BWP 1322 to the UE for both MBMS and unicast transmissions (as indicated by 1314). According to Option 3, the UE 1302 may inform base station 1304 that the UE does not have the capability to simultaneously receive MBMS and unicast transmissions (as indicated by 1316). The base station 1304 may in response reconfigure UE 1302, allocating the MSBM BWP to be within BWP #1 to use BWP #1 1320 for both MBMS and unicast transmissions (as indicated by 13148).

MBMS-Specific Resource(s) for PTM Transmission

In some aspects, instead of allocating/configuring an additional MBMS-specific BWP which may be used by the UE, the network (e.g. a base station) may configure MBMS-specific resources, e.g. MBMS-specific frequency resources, within a UE-dedicated BWP allocated/configured for the UE. For example, the base station may configure multiple dedicated BWPs for the LIE, with specific frequency resources within a given BWP (among the dedicated BWPs for the UE) configured for MBMS PTM data transmissions, thereby configuring the given BWP as an MBMS BWP over which the UE may receive MBMS PTM transmissions. The base station may provide MBMS data transmissions over the MBMS BWP when the given BWP is the active BWP on which the UE communicates. When applicable, the base station may provide the MBMS PTM scheduling information associated with the MBMS BWP to the UE for reception of MBMS transmission(s) by the UE over the MBMS BWP. For example, the base station may indicate to the UE whether a given UE-dedicated BWP may be used for PTM data scheduling and transmission, and may provide the corresponding scheduling configuration/resource information, e.g. CORSET, Search Space, etc. to the UE. Once MBMS PTM scheduling has been configured for the active BWP, the UE may monitor the PTM scheduling and receive the MBMS data accordingly. Alternatively, the UE may rely on the base station delivering the MBMS data to the UE via the current/active BWP according to PTP unicast scheduling by the base station. It should be noted that the MBMS PTM data transmission start/stop mechanisms and PTM/PTP collision avoidance mechanisms described above with respect to implementations of an MBMS-specific BWP may equally apply in case of MBMS-specific resource allocation for PTM data transmission.

Figure 14:
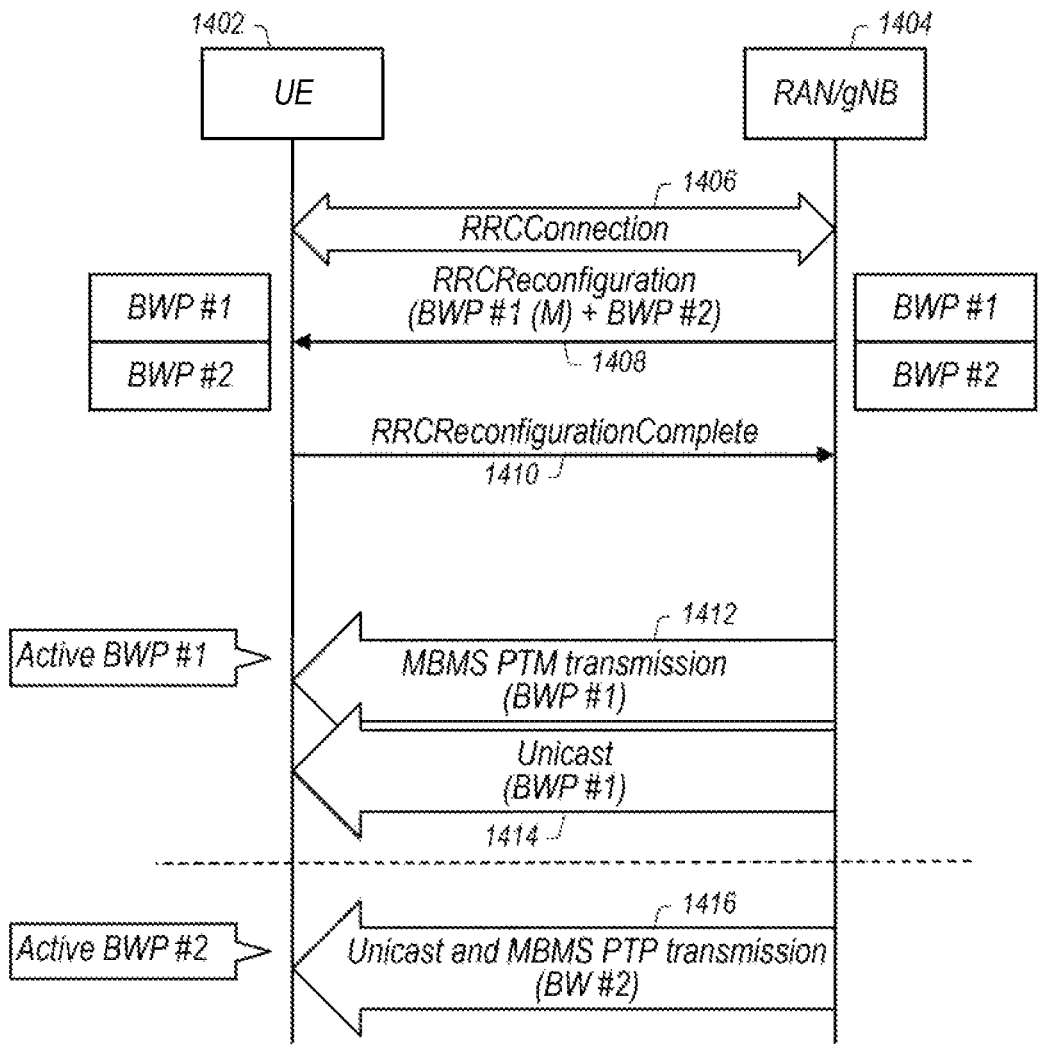
FIG. 14 illustrates an example of wireless communications in which MBMS-specific resources within a designated BWP are allocated for MBMS-PTM transmissions, according to some aspects.

One example of signaling in which MBMS-specific resources, e.g. MBMS-specific frequency resources, are used for PTM transmission is illustrated in FIG. 14. Once RRC connection between UE 1402 and base station 1404 has been established (as indicated by 1406), the base station 1404 may configure/allocate BWP #1 and BWP #2 for UE 1402 (as indicated by 1408). The base station 1404 may indicate that MBMS transmissions may take place in/over BWP #1, while BWP #2 may be intended for unicast transmissions only. The base station $1404 may also provide scheduling information to UE 1402 regarding the MBMS PTM transmissions in BWP #1. The UE 1402 may inform base station 1404 that the reconfiguration is complete (as indicated by 1410). When BWP #1 is active, base station 1404 may transmit MBMS data over active BWP #1 according to the configured schedule for MBMS PTM transmissions (as indicated by 1412), while also transmitting unicast data on BWP #1 as applicable (as indicated by 1414). When BWP #2 is active, since no MBMS-specific resources and scheduling for MBMS PTM transmissions is configured for BWP #2, MBMS data and unicast data are both transmitted by base station 1404 via PTP transmissions (as indicated by 1416). Switching between PTP transmission(s) and PTM transmission(s) may be accomplished in a variety of ways. Three options for L2 packet handling when switching between PTP and PTM are illustrated in FIG. 15.

Figure 15:
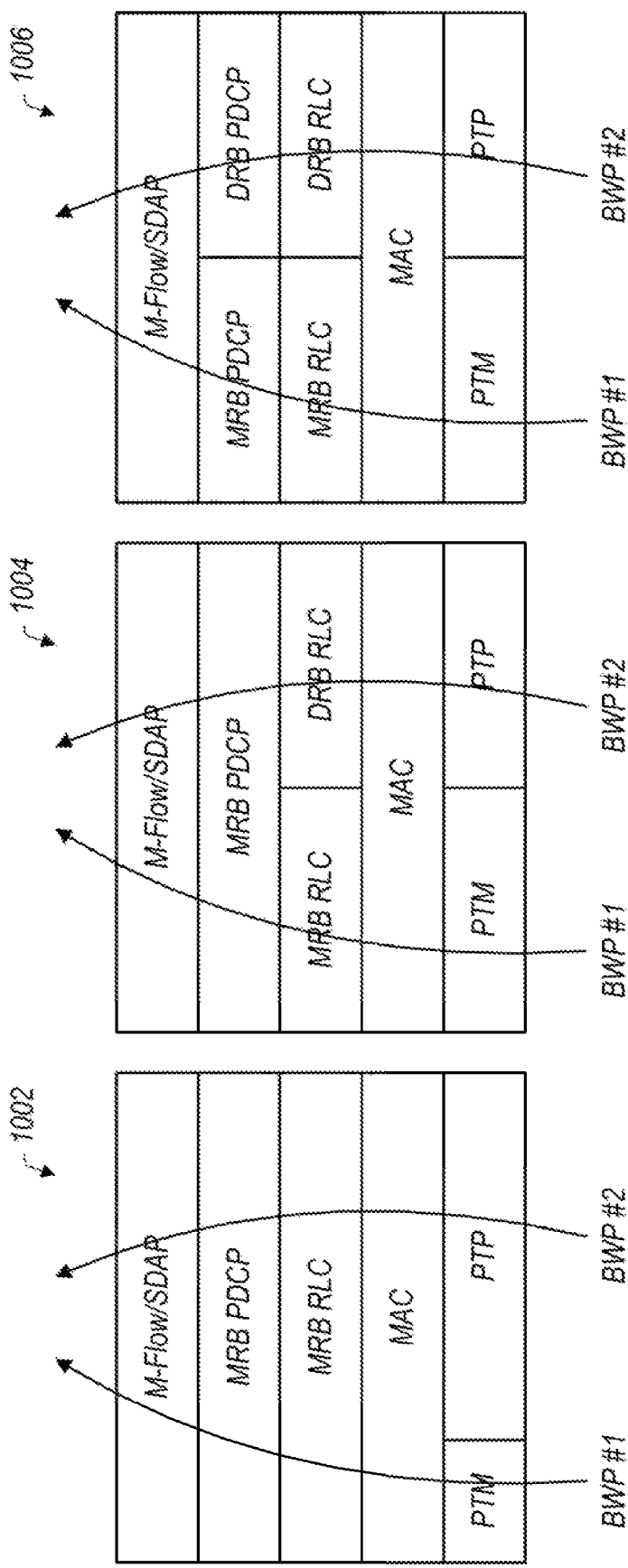
FIG. 15 illustrates three examples of resource stack use by different BWPs during wireless communications in which MBMS-specific resources within a designated BWP are used for MBMS-PTM transmissions, according to some aspects.

FIG. 15 provides a partial illustration of layers (L1 and L2) in a communication architecture according to some aspects. According to a first option 1002, a single channel is configured for and associated with RLC, PDCP (Packet Data Convergence Protocol), and SDAP (Service Data Adaptation Protocol). When switching between BWP #1 and BWP #2, L2 handling of the data may be the same whether the data was received over a PTM transmission on BWP #1 or over a PTP transmission on BWP #2. According to a second option 1004, RCL may be configured separately for MRB and DRB. That is, different radio bearers may be configured for PTM transmissions and PTP transmission, and thus L2 RLC handling may be different for PTM transmissions over BWP #1 and PTP transmissions over BWP #2. For example, a PTM-specific logic channel ID may be used for data transmission/reception for PTM transmission, and the same PDCP data may be transmitted through a different DRB-specific logic channel. According to a third option 1006, completely different resources are configured for PTM and PTP transmissions. Thus, in addition to separate RLC logic channels respectively corresponding to the MRB and the DRB, separate respective PDCP stacks are used for receiving data via PTM transmissions and for receiving data via PTP transmissions, as shown.

UE Capability of the MBMS and Unicast Reception

The network (e.g. base station) may provide the serving cell set configuration (for carrier aggregation, CA, and/or dual connectivity, DC) according to the capability of the UE to simultaneously receive MBMS and unicast transmissions. For CA/DC capability, the UE may report its capability of simultaneous MBMS-PTM and unicast reception to the network, e.g. to a serving base station. The capability may be defined in terms of different granularities, for example the capability may be per band combination, or per band, or per UE. For per-UE capability, the network may assume that for all UE supported CA/DC best combination, the UE may support the MBMS and unicast transmission on the different serving cells. For non-CA capability, e.g. for single-cell case, at least two options may be implemented:

Option 1: The UE may report whether it supports unicast and MBMS reception on the same cell. The support may be per cell, per band or per band combination. If the UE cannot support unicast and MBMS reception on the same cell, the network may not configure the MBMS-PTM and unicast PTP on the same serving cell; and Option 2: The UE may report whether it supports unicast and MBMS reception on the same or different BWP, on the same or different frequencies, and/or on the same or different subcarrier spacings of the same serving cell. If the UE cannot support unicast and MBMS reception as listed above, the network may not configure the MBMS-PTM and unicast PTP on the non-overlapped frequency resource, or the network may provide the MBMS-PTM transmission via the UE activated BWP.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, in some aspects, the present disclosure may be realized as a computer-implemented method, a computer-readable memory medium, or a computer system. In other aspects, the present disclosure may be realized using one or more custom-designed hardware devices such as ASICs. In other aspects, the present disclosure may be realized using one or more programmable hardware elements such as FPGAs.

In some aspects, a non-transitory computer-readable memory medium (e.g., a non-transitory memory element) may be configured so that it stores program instructions and/or data, where the program instructions, if executed by a computer system, cause the computer system to perform a method, e.g., any of the methods described herein, or, any combination of the methods described herein, or, any subset of any of the methods described herein, or, any combination of such subsets.

In some aspects, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various methods described herein (or, any combination of the methods described herein, or, any subset of any of the methods described herein, or, any combination of such subsets). The device may be realized in any of various forms.

Any of the methods described herein for operating a user equipment (UE) or device may be the basis of a corresponding method for operating a base station or appropriate network node, by interpreting each message/signal X received by the UE in the downlink as message/signal X transmitted by the base station/network node, and each message/signal Y transmitted in the uplink by the UE as a message/signal Y received by the base station/network node.

Although the aspects above have been described in considerable detail, numerous variations and modifications will become apparent to those skilled in the art once the above disclosure is fully appreciated. It is intended that the following claims be interpreted to embrace all such variations and modifications.

The invention claimed is:

1. A baseband processor comprising:
   memory configured to store information; and
   processing circuitry coupled with the memory and configured to:
   receive a multimedia broadcast message transmitted in a multimedia broadcast and multicast service (MBMS) transmission during wireless communications in a connect state within a wireless network over first frequency resources within a first bandwidth part (BWP), wherein the first BWP is dedicated for a device and the first frequency resources are specifically allocated for MBMS transmissions within the first BWP.

2. The baseband processor of claim 1, wherein the processing circuitry is further configured to:
   receive a message transmitted in a unicast transmission over a second BWP different from the first BWP.

3. The baseband processor of claim 2,
   wherein the unicast transmission and the MBMS transmission take place simultaneously.

4. The baseband processor of claim 1, wherein the MBMS transmission is a point-to-multipoint data transmission.

5. The baseband processor of claim 1, wherein the processing circuitry is further configured to:
   receive a second multimedia broadcast message transmitted in a second MBMS transmission as a point-to-point transmission;
   wherein MBMS data transmissions have a common packet data convergence protocol (PDCP) entity and different respective radio link control (RLC) entities when switching between point-to-point and point-to-multipoint transmissions.

6. The baseband processor of claim 1, wherein the processing circuitry is further configured to:
   generate capability information for transmission to a base station, wherein the capability information indicates that the device supports simultaneous reception of MBMS and unicast transmissions.

7. The baseband processor of claim 6, wherein the capability information is indicative of one of:
   capability defined per band combination;
   capability defined per band; or
   capability defined per device.

8. The baseband processor of claim 1, wherein the processing circuitry is further configured to:
   receive a plurality of multimedia broadcast messages transmitted in a corresponding plurality of MBMS transmissions during wireless communications in a connected state within the wireless network over respective corresponding BWPs specifically allocated for MBMS transmissions, wherein each BWP of the respective corresponding BWPs corresponds to a different respective serving cell of the device.

9. The baseband processor of claim 1, wherein the processing circuitry is further configured to:
   start and stop reception of the MBMS transmission, according to one or more of:
   an explicit indication received in a common command for starting the reception and an explicit indication received in a subsequent common command for stopping the reception;
   an explicit indication received in a device-specific command for starting the reception and an explicit indication received in a subsequent device-specific command for stopping the reception; or an autonomous determination whether to receive the MBMS transmission.

10. The baseband processor of claim 1, wherein the processing circuit is further configured to:

receive a unicast message transmitted in a unicast transmission over a second BWP when the second BWP is active for the device.

11. The baseband processor of claim 1, wherein the MBMS transmission takes place according to previously received scheduling configuration and resource information, over the first BWP when the first BWP is active.

12. A base station comprising:

radio circuitry configured to facilitate wireless communications of the base station; and a baseband processor coupled to the radio circuitry and configured to interoperate with the radio circuitry to:

wirelessly communicate within a wireless network; and transmit, as part of wirelessly communicating within the wireless network, a multimedia broadcast message in multimedia broadcast and multicast service (MBMS) transmission over first frequency resources within a first bandwidth part (BWP), wherein the first BWP is dedicated for a device and the first frequency resources are specifically allocated for MBMS transmissions within the first BWP.

13. The base station of claim 12, wherein the baseband processor is configured to interoperate with the radio circuitry to:

transmit a second MBMS transmission as a point-to-point transmission;

wherein MBMS data transmissions have a common packet data convergence protocol (PDCP) entity and different respective radio link control (RLC) entities when switching between point-to-point and point-to-multipoint transmissions.

14. The base station of claim 12, wherein the baseband processor is configured to interoperate with the radio circuitry to:

receive capability information from the device, wherein the capability information indicates that the device supports simultaneous reception of MBMS and unicast transmissions.

15. The base station of claim 14, wherein the capability information is indicative one of:

capability defined per band combination;

capability defined per band; or capability defined per device.

16. The base station of claim 12, wherein the baseband processor is configured to interoperate with the radio circuitry to perform one or more of:

transmit an explicit indication in a common command for the device to start the reception of the MBMS transmission, and an explicit indication in a subsequent common command for the device to stop the reception; or transmit an explicit indication in a device-specific command for the device to start the reception, and an explicit indication in a subsequent device-specific command for the device to stop the reception.

17. A non-transitory memory element storing programming instructions executable by a processor to:

cause wireless communications of a base station within a wireless network; and cause transmission, as part of the wireless communications within the wireless network, of a multimedia broadcast message in a multimedia broadcast and multicast service (MBMS) transmission over first frequency resources within a first bandwidth part (BWP), wherein the first BWP is dedicated for a device and the first frequency resources are specifically allocated for MBMS transmissions within the first BWP.

18. The non-transitory memory element of claim 17, wherein the programming instructions are further executable by the processor to:

cause transmission of a second MBMS transmission as a point-to-point transmission;

wherein MBMS data transmissions have a common packet data convergence protocol (PDCP) entity and different respective radio link control (RLC) entities when switching between point-to-point and point-to-multipoint transmissions.

19. The non-transitory memory element of claim 17, wherein the programming instructions are further executable by the processor to:

cause reception of capability information from a device, wherein the capability information indicates that the device supports simultaneous reception of MBMS and unicast transmissions.

20. The non-transitory memory element of claim 19, wherein the capability information is indicative of one of:

capability defined per band combination;

capability defined per band; or capability defined per device.

* * * * *